United States Patent
Salkintzis

(10) Patent No.: US 12,052,606 B2
(45) Date of Patent: Jul. 30, 2024

(54) DATA PACKET STEERING ON A MULTI-ACCESS DATA CONNECTION

(71) Applicant: Lenovo (Singapore) PTE. LTD., New Tech Park (SG)

(72) Inventor: Apostolis Salkintzis, Athens (GR)

(73) Assignee: Lenovo (Singapore) Pte. Ltd., New Tech Park (SG)

(*) Notice: Subject to any disclaimer, the term of this patent is extended or adjusted under 35 U.S.C. 154(b) by 314 days.

(21) Appl. No.: 16/753,929

(22) PCT Filed: Apr. 9, 2018

(86) PCT No.: PCT/EP2018/059041
§ 371 (c)(1),
(2) Date: Apr. 6, 2020

(87) PCT Pub. No.: WO2019/197016
PCT Pub. Date: Oct. 17, 2019

(65) Prior Publication Data
US 2021/0410010 A1    Dec. 30, 2021

(51) Int. Cl.
*H04W 28/086* (2023.01)
*H04W 76/10* (2018.01)
*H04W 84/12* (2009.01)

(52) U.S. Cl.
CPC ......... *H04W 28/086* (2023.05); *H04W 76/10* (2018.02); *H04W 84/12* (2013.01)

(58) Field of Classification Search
CPC . H04W 28/0804; H04W 28/08; H04W 76/10; H04W 76/15; H04W 84/12; H04W 40/22; H04W 88/06
See application file for complete search history.

(56) References Cited

U.S. PATENT DOCUMENTS

| 11,665,627 B2* | 5/2023 | Sirotkin | H04W 48/18 370/328 |
| 2012/0250616 A1* | 10/2012 | Hu | H04W 76/15 370/328 |

(Continued)

OTHER PUBLICATIONS

PCT/EP2018/059041, "Notification of Transmittal of the International Search Report and the Written Opinion of the International Searching Authority, or the Declaration", PCT, Dec. 19, 2018, pp. 1-16.

(Continued)

*Primary Examiner* — Redentor Pasia
(74) *Attorney, Agent, or Firm* — Kunzler Bean & Adamson

(57) ABSTRACT

Apparatuses, methods, and systems are disclosed for data packet steering on a multi-access data connection. One apparatus includes a processor, a first transceiver and a second transceiver that communicate with a mobile communication network via a first access network and a second access network, respectively. The processor determines to establish a multi-access data connection that includes a first user-plane connection over the first access network and a second user-plane connection over the second access network. The processor receives steering rules for the multi-access data connection and generates a first data packet to be sent over the multi-access data connection. The processor transmits the first data packet over a selected one of the first and second user-plane connections, the selection based a first steering rule that applies to the first data packet.

19 Claims, 11 Drawing Sheets

(56) References Cited

U.S. PATENT DOCUMENTS

| | | | | |
|---|---|---|---|---|
| 2013/0016696 | A1* | 1/2013 | Adjakple | H04W 72/52 |
| | | | | 370/328 |
| 2014/0293982 | A1* | 10/2014 | Gupta | H04L 41/08 |
| | | | | 370/338 |
| 2015/0195759 | A1* | 7/2015 | Sirotkin | H04W 36/22 |
| | | | | 370/331 |
| 2016/0142963 | A1* | 5/2016 | Salkintzis | H04L 45/308 |
| | | | | 370/329 |
| 2017/0311235 | A1* | 10/2017 | Sirotkin | H04W 8/005 |
| 2018/0097894 | A1* | 4/2018 | Li | H04L 67/141 |
| 2018/0098276 | A1* | 4/2018 | Livanos | H04W 48/08 |
| 2018/0152861 | A1* | 5/2018 | Giraldo Rodriguez | |
| | | | | H04W 16/22 |
| 2018/0279192 | A1* | 9/2018 | Raissinia | H04W 36/08 |
| 2018/0317157 | A1* | 11/2018 | Baek | H04W 48/18 |
| 2018/0338268 | A1* | 11/2018 | Lee | H04L 47/2475 |
| 2018/0376530 | A1* | 12/2018 | Fujishiro | H04W 76/18 |
| 2019/0191467 | A1* | 6/2019 | Dao | H04W 76/10 |
| 2019/0222489 | A1* | 7/2019 | Shan | H04M 15/8033 |
| 2019/0261449 | A1* | 8/2019 | Kim | H04L 65/1046 |
| 2019/0274178 | A1* | 9/2019 | Salkintzis | H04W 76/15 |
| 2019/0306068 | A1* | 10/2019 | Kiss | H04W 36/08 |
| 2019/0306752 | A1* | 10/2019 | Lai | H04W 88/06 |
| 2020/0145876 | A1* | 5/2020 | Dao | H04W 28/06 |
| 2020/0178196 | A1* | 6/2020 | Wang | H04W 48/18 |
| 2020/0245381 | A1* | 7/2020 | Talebi Fard | H04W 72/04 |
| 2021/0007167 | A1* | 1/2021 | Salkintzis | H04W 12/03 |
| 2021/0014742 | A1* | 1/2021 | Wang | H04W 36/0027 |
| 2021/0037585 | A1* | 2/2021 | Youn | H04W 48/16 |

OTHER PUBLICATIONS

3GPP, "3rd Generation Partnership Project; Technical Specification Group Services and System Aspects; Network-Based IP Flow Mobility (NBIFOM); Stage 2 (Release 14)", 3GPP TS 23.161 V14.0.0, Mar. 2017, pp. 1-67.

Interdigital Inc. "Network-controlled Traffic Steering for Multi-access PDU Session", SA WG2 Meeting #126 S2-182017, Feb. 26-Mar. 2, 2018, pp. 1-4.

3GPP, "3rd Generation Partnership Project; Technical Specification Group Services and System Aspects; Procedures for the 5G System; Stage 2 (Release 15)", 3GPP TS 23.502 V15.1.0, Mar. 2018, pp. 1-285.

3GPP, "3rd Generation Partnership Project; Technical Specification Group Services and System Aspects; Study on Access Traffic Steering, Switching and Splitting support in the 5G system architecture (Release 16)", 3GPP TR 23.793 V0.3.0, Mar. 2018, pp. 1-24.

3GPP, "3rd Generation Partnership Project; Technical Specification Group Services and System Aspects; System Architecture for the 5G System; Stage 2 (Release 15)", 3GPP TS 23.501 V15.1.0, Mar. 2018, pp. 1-201.

Interdigital Inc. "UE Requested Multi-access PDU Session Establishment", SA WG2 Meeting #126 S2-182015, Feb. 26- Mar. 2, 2018, pp. 1-4.

* cited by examiner

DATA PACKET STEERING ON A MULTI-ACCESS DATA CONNECTION

FIELD

The subject matter disclosed herein relates generally to wireless communications and more particularly relates to steering a data packet to a specific user-plane connection of a multi-access data connection.

BACKGROUND

The following abbreviations and acronyms are herewith defined, at least some of which are referred to within the following description.

Third Generation Partnership Project ("3GPP"), Access and Mobility Management Function ("AMF"), Access Point Name ("APN"), Access Stratum ("AS"), Carrier Aggregation ("CA"), Clear Channel Assessment ("CCA"), Control Channel Element ("CCE"), Channel State Information ("CSI"), Common Search Space ("CSS"), Data Network Name ("DNN"), Data Radio Bearer ("DRB"), Downlink Control Information ("DCI"), Downlink ("DL"), Enhanced Clear Channel Assessment ("eCCA"), Enhanced Mobile Broadband ("eMBB"), Evolved Node-B ("eNB"), Evolved Packet Core ("EPC"), Evolved UMTS Terrestrial Radio Access Network ("E-UTRAN"), European Telecommunications Standards Institute ("ETSI"), Frame Based Equipment ("FBE"), Frequency Division Duplex ("FDD"), Frequency Division Multiple Access ("FDMA"), Globally Unique Temporary UE Identity ("GUTI"), Hybrid Automatic Repeat Request ("HARQ"), Long Term Evolution ("LTE"), LTE Advanced ("LTE-A"), Medium Access Control ("MAC"), Multiple Access ("MA"), Modulation Coding Scheme ("MCS"), Machine Type Communication ("MTC"), Massive MTC ("mMTC"), Mobility Management ("MM"), Mobility Management Entity ("MME"), Multiple Input Multiple Output ("MIMO"), Multipath TCP ("MPTCP"), Multi User Shared Access ("MUSA"), Multiple-Access Protocol Data Unit ("MA-PDU"), Non-Access Stratum ("NAS"), Narrowband ("NB"), Network Function ("NF"), Next Generation (e.g., '5G') Node-B ("gNB"), Next Generation Radio Access Network ("NG-RAN"), New Radio ("NR"), Policy Control & Charging ("PCC"), Policy Control Function ("PCF"), Policy Control and Charging Rules Function ("PCRF"), Packet Data Network ("PDN"), Packet Data Unit ("PDU"), Quality of Service ("QoS"), Quadrature Phase Shift Keying ("QPSK"), Radio Access Network ("RAN"), Radio Access Technology ("RAT"), Radio Resource Control ("RRC"), Receive ("RX"), Switching/Splitting Function ("SSF"), Scheduling Request ("SR"), Session Management Function ("SMF"), System Information Block ("SIB"), Transport Block ("TB"), Transport Block Size ("TBS"), Time-Division Duplex ("TDD"), Time Division Multiplex ("TDM"), Transmission and Reception Point ("TRP"), Transmit ("TX"), Uplink Control Information ("UCI"), Unified Data Management ("UDM"), User Entity/Equipment (Mobile Terminal) ("UE"), Uplink ("UL"), User Plane ("UP"), Universal Mobile Telecommunications System ("UMTS"), Ultra-reliability and Low-latency Communications ("URLLC"), and Worldwide Interoperability for Microwave Access ("WiMAX"). As used herein, "HARQ-ACK" may represent collectively the Positive Acknowledge ("ACK") and the Negative Acknowledge ("NAK"). ACK means that a TB is correctly received while NAK means a TB is erroneously received.

In wireless communication systems, a Multi-Access PDU (MA-PDU) session may be established between a UE and a Data Network (DN) via the mobile communication network. In various embodiments, the MA-PDU session includes two user-plane paths, each one using a different access network type. Here, the two user-plane paths share the same IP address. However, there is no mechanism for the UE to steering the traffic of a MA-PDU session to a specific access network.

BRIEF SUMMARY

Methods for steering a data packet to a specific user-plane connection of a multi-access data connection are disclosed. Apparatuses and systems also perform the functions of the methods. One method for steering a data packet to a specific user-plane connection of a multi-access data connection includes receiving, from a function running on a user equipment ("UE"), a request to establish a data connection. The method includes determining, by the UE, to establish a multi-access data connection. Here, the multi-access data connection includes a first user-plane connection over a first access network and a second user-plane connection over a second access network. The method includes receiving, at the UE, a plurality of steering rules. Here, each steering rule includes a steering mode selected from a plurality of steering modes. The method includes generating, at the UE, a first data packet to be sent over the multi-access data connection. The method includes identifying a first steering rule that applies to the first data packet from the plurality of steering rules and transmitting the first data packet over a selected one of the first user-plane connection and the second user-plane connection. Here, the selection is based on the steering mode of the first steering rule.

A second method for steering a data packet to a specific user-plane connection of a multi-access data connection includes receiving, from a function running on a UE, a request to establish a data connection with the mobile communication network. The second method includes determining, by the UE, to establish a multi-access data connection. Here, the multi-access data connection includes a first user-plane connection over the first access network and a second user-plane connection over the second access network. The second method includes sending a first message requesting establishment of a multi-access data connection over the first access network and the second access network. Moreover, the second method includes receiving a second message that includes a plurality of steering rules. Here, each steering rule indicates a steering mode selected from a plurality of steering modes. The second method includes generating a first data packet to be sent over the multi-access data connection, identifying a first steering rule that applies to the first data packet from the plurality of steering rules, and transmitting the first data packet over a selected one of the first user-plane connection and the second user-plane connection. Here, the selection based on a steering mode of the first steering rule.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
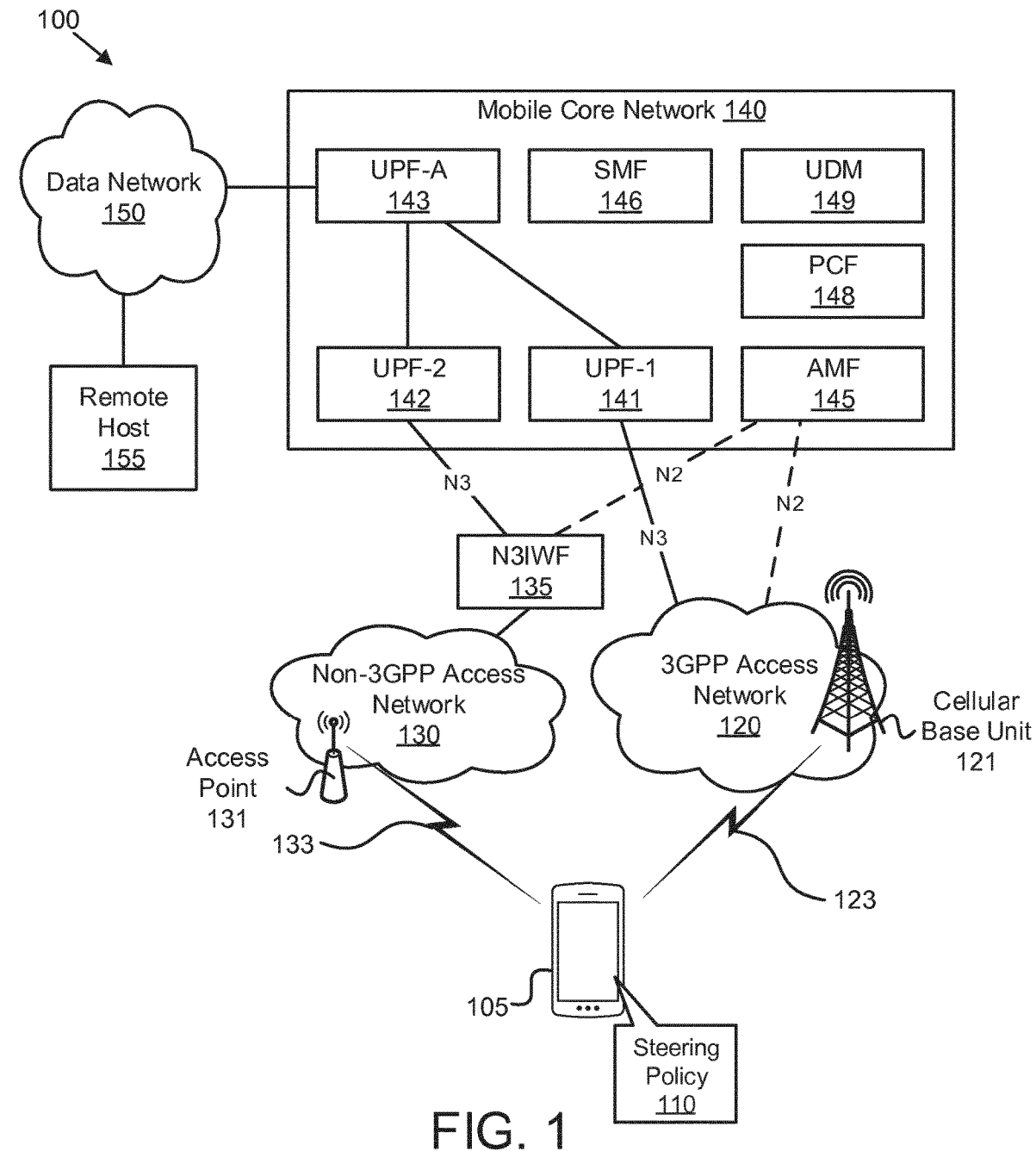
FIG. 1 is a schematic block diagram illustrating one embodiment of a wireless communication system for steering a data packet to a specific user-plane connection of a multi-access data connection.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store, a program for use by or in connection with an instruction execution system, apparatus, or device.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams.

The code may also be loaded onto a computer, other programmable data processing apparatus, or other devices to cause a series of operational steps to be performed on the computer, other programmable apparatus, or other devices to produce a computer implemented process such that the code which execute on the computer or other programmable apparatus provide processes for implementing the functions/acts specified in the schematic flowchart diagrams and/or schematic block diagram.

The schematic flowchart diagrams and/or schematic block diagrams in the Figures illustrate the architecture, functionality, and operation of possible implementations of apparatuses, systems, methods, and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

The description of elements in each figure may refer to elements of proceeding figures. Like numbers refer to like elements in all figures, including alternate embodiments of like elements.

Methods, apparatuses, and systems are disclosed for a UE to steer traffic of a data flow using a Multi-Access PDU ("MA-PDU") session, or other multi-access data connection. Although a MA-PDU session is commonly used as an example to describe the establishment of the multi-access data connection, other types of multi-access data connection may be established using the disclosed methods, apparatuses, systems, and procedures.

FIG. 1 depicts a wireless communication system 100 for steering a data packet to a specific user-plane connection of a multi-access data connection, according to embodiments of the disclosure. In one embodiment, the wireless communication system 100 includes at least one remote unit 105, a 3GPP access network 120 containing at least one cellular base unit 121, 3GPP communication links 123, a non-3GPP access network 130 containing at least one access point 131, non-3GPP access communication links 133, and a mobile core network 140. Even though a specific number of remote units 105, 3GPP access networks 120, cellular base units 121, 3GPP communication links 123, non-3GPP access networks 130, access points 131, non-3GPP communication links 133, and mobile core networks 140 are depicted in FIG. 1, one of skill in the art will recognize that any number of remote units 105, 3GPP access networks 120, cellular base units 121, 3GPP communication links 123, non-3GPP access networks 130, access points 131, non-3GPP communication links 133, and mobile core networks 140 may be included in the wireless communication system 100.

In one implementation, the wireless communication system 100 is compliant with the 5G system specified in the 3GPP specifications. More generally, however, the wireless communication system 100 may implement some other open or proprietary communication network, for example, LTE or WiMAX, among other networks. The present disclosure is not intended to be limited to the implementation of any particular wireless communication system architecture or protocol.

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as subscriber units, mobiles, mobile stations, users, terminals, mobile terminals, fixed terminals, subscriber stations, UE, user terminals, a device, or by other terminology used in the art. The remote units 105 may communicate directly with one or more of the cellular base units 121 via uplink ("UL") and downlink ("DL") communication signals. Furthermore, the UL and DL communication signals may be carried over the 3GPP communication links 123. Similarly, the remote units 105 may communicate with one or more access points 131 in non-3GPP access networks 130 via UL and DL communication signals carried over the non-3GPP communication links 133.

In some embodiments, the remote units 105 communicate with a remote host 155 via a network connection with the mobile core network 140. For example, a remote unit 105 may establish a PDU session (or other data connection) with the mobile core network 140 using a 3GPP access network 120 and/or a non-3GPP access network 130. The mobile core network 140 then relays traffic between the remote unit 105 and the data network 150 (e.g., a remote host 155 in the data network 150) using the PDU session. As discussed in further detail below, the PDU session may be a multiple-access PDU ("MA-PDU") session having user-plane connections (e.g., paths) via both the 3GPP access network 120 and the non-3GPP access network 130.

The cellular base units 121 may be distributed over a geographic region. In certain embodiments, a cellular base unit 121 may also be referred to as an access terminal, a base, a base station, a Node-B, an eNB, a gNB, a Home Node-B, a relay node, a device, or by any other terminology used in the art. The cellular base units 121 are generally part of a radio access network ("RAN"), such as the 3GPP access network 120, that may include one or more controllers communicably coupled to one or more corresponding cellular base units 121. These and other elements of radio access network are not illustrated but are well known generally by those having ordinary skill in the art. The cellular base units 121 connect to the mobile core network 140 via the 3GPP access network 120.

The cellular base units 121 may serve a number of remote units 105 within a serving area, for example, a cell or a cell sector, via a wireless communication link 123. The cellular base units 121 may communicate directly with one or more of the remote units 105 via communication signals. Generally, the cellular base units 121 transmit DL communication signals to serve the remote units 105 in the time, frequency, and/or spatial domain. Furthermore, the DL communication signals may be carried over the 3GPP communication links 123. The 3GPP communication links 123 may be any suitable carrier in licensed or unlicensed radio spectrum. The 3GPP communication links 123 facilitate communication between one or more of the remote units 105 and/or one or more of the cellular base units 121.

The non-3GPP access networks 130 may be distributed over a geographic region. Each non-3GPP access network 130 may serve a number of remote units 105 with a serving area. Typically, a serving area of the non-3GPP access network 130 is smaller than the serving area of a cellular base unit 121. An access point 131 in a non-3GPP access network 130 may communicate directly with one or more remote units 105 by receiving UL communication signals and transmitting DL communication signals to serve the remote units 105 in the time, frequency, and/or spatial domain. Both DL and UL communication signals are carried over the non-3GPP communication links 133. The 3GPP communication links 123 and non-3GPP communication links 133 may employ different frequencies and/or different communication protocols. In various embodiments, an access point 131 may communicate using unlicensed radio spectrum. The mobile core network 140 may provide services to a remote unit 105 via the non-3GPP access networks 130, as described in greater detail herein.

In some embodiments, a non-3GPP access network 130 connects to the mobile core network 140 via a non-3GPP interworking function ("N3IWF") 135. The N3IWF 135 provides interworking between a non-3GPP access network 130 and the mobile core network 140, supporting connectivity via the "N2" and "N3" interfaces. As depicted, both the 3GPP access network 120 and the N3IWF 135 communicate with the AMF 145 using a "N2" interface and with the UPFs 141, 142 using a "N3" interface.

In certain embodiments, a non-3GPP access network 130 may be controlled by an operator of the mobile core network 140 and may have direct access to the mobile core network 140. Such a non-3GPP AN deployment is referred to as a "trusted non-3GPP access network." A non-3GPP access network 130 is considered as "trusted" when it is operated by the 3GPP operator, or a trusted partner, and supports certain security features, such as strong air-interface encryption. While the N3IWF 135 is depicted as being located outside both the non-3GPP access network 130 and the core network 140, in other embodiments the N3IWF 135 may be co-located with the non-3GPP access network 130 (e.g., if the non-3GPP access network 130 is a trusted non-3GPP access network) or located within the core network 140.

In one embodiment, the mobile core network 140 is a 5G core ("5GC") or the evolved packet core ("EPC"), which may be coupled to a data network 150, like the Internet and private data networks, among other data networks. A remote unit 105 may have a subscription or other account with the mobile core network 140. Each mobile core network 140 belongs to a single public land mobile network ("PLMN"). The present disclosure is not intended to be limited to the implementation of any particular wireless communication system architecture or protocol.

The mobile core network 140 includes several network functions ("NFs"). As depicted, the mobile core network 140 includes multiple user plane functions ("UPFs"). Here, the mobile core network 140 includes a first UPF ("UPF-1") 141 that serves a 3GPP access network 120, a second UPF 142 ("UPF-2") that serves a non-3GPP access network 130, and an anchor UPF ("UPF-A") 143. In other embodiments, the 3GPP access network 120 and non-3GPP access network 130 may connect directly to the UPF-A 143. The mobile core network 140 also includes multiple control plane functions including, but not limited to, an Access and Mobility Management Function ("AMF") 145, a Session Management Function ("SMF") 146, a Policy Control Function ("PCF") 148, and a Unified Data Management function ("UDM") 149. Although specific numbers and types of network functions are depicted in FIG. 1, one of skill in the art will recognize that any number and type of network functions may be included in the mobile core network 140.

As depicted, a remote unit 105 may be connected to both a cellular base unit 121 in a 3GPP access network 120 and an access point 131 in a non-3GPP access network 130. The remote unit 105 may transmit a request to establish a data connection over one of the 3GPP access network 120 and the non-3GPP access network 130, thus establishing a multi-access data connection. Here, the multi-access data connection includes a first user-plane connection via the 3GPP access network 120 and a second user-plane connection via the non-3GPP access network 130.

In some embodiments, the request includes an indication that a multi-access data connection is to be established (e.g., a UE-initiated multi-access data connection). For example, the remote unit 105 may indicate that a multi-access data connection is to be established by including a first session identifier (e.g., associated with the 3GPP access network 120) and a second session identifier (e.g., associated with the non-3GPP access network 130) in the establishment request. As another example, the remote unit 105 may indicate that a multi-access data connection is to be established by including a session identifier and a multi-access parameter in the request.

After receiving the request to establish a data connection, the SMF 146 initiates the multi-access data connection by triggering the establishment of a data path (e.g., a first user-plane connection) over the 3GPP access network 120 and triggering the establishment of another data path (e.g., a second user-plane connection) over the non-3GPP access network 130. Note that the multi-access data connection is anchored at a common UPF (e.g., the UPF-A 143). Specific procedures usable for establishing a multi-access PDU session in the wireless communication system 100 are described in 3GPP TS 23.502 and 3GPP TR 23.793.

As used here, a PDU session refers to a network connection in the wireless communication system 100 established by the remote unit 105. A PDU session is a logical connection between the remote unit 105 and a data network, such as the data network 150. A remote unit 105 may have multiple PDU sessions at a time. Each PDU session is distinguishable by a unique combination of Data Network Name ("DNN"), Session and Service Continuity ("SSC") mode, and/or network slice identifier (e.g., S-NSSAI). In various embodiments, each PDU session is associated with a different IP address. Note however, that a MA-PDU session has a single IP address even though there are multiple user-plane connections to the mobile core network 140.

To steer traffic on a multi-access data connection, a remote unit 105 is configured, e.g., by the mobile core network 140, with a set of traffic steering rules, forming a steering policy 110 for the multi-access data connection. In one embodiment, the steering policy 110 (also referred to as an Access Traffic Steering, Switching and Splitting ("ATSSS") policy) is received during establishment of the multi-access data connection, for example in a PDU establishment accept message. Here, the traffic steering rules may be specific to a data network (e.g., an endpoint of the multi-access data connection), specific to a remote unit 105 (e.g., based on a subscription and/or on a roaming status of the remote unit 105), specific to a combination of data network and remote unit 105, or the like.

For each data flow using the multi-access data connection, the remote unit 105 identifies an applicable traffic steering rule and routes the traffic to a specific user-plane connection based on the applicable traffic steering rule. In various embodiments, the set of traffic steering rules is a prioritized list of rules also having a default rule (e.g., a lowest-priority rule). Traffic steering rules are examined in priority order. In some embodiments, each traffic steering rule has a traffic filter used to determine whether the rule is applicable to a data packet (e.g., of the data flow) to be sent on the multi-access data connection. A data packet matches a traffic steering rule if the information in the data packet (e.g. protocol, port number, etc.) matches with the corresponding information in the traffic filter of the rule.

Moreover, a traffic steering rule may include a traffic steering mode that indicate a specific strategy to be used to steer the data traffic. Here, the traffic steering rule indicates a specific traffic steering mode from a (e.g., predefined) set of traffic steering modes. Example of traffic steering modes include, but are not limited to, a policy-based steering mode, a priority-based steering mode, an active-standby steering mode, a best-access steering mode, a redundant steering mode, and a load-balancing steering mode. The traffic steering mode may also be referred to as a "steering strategy." Various steering modes are discussed in further detail below, with reference to FIGS. 5A-5F.

In some embodiments, each traffic steering rule in the set of traffic steering rules indicates a traffic steering mode from the set. In certain embodiments, only the default traffic rule indicates a traffic steering mode. Moreover, in various embodiments, multiple traffic steering modes are contained in the set of traffic steering rules, such that a first traffic steering rule has a different traffic steering mode than a second traffic steering rule.

Figure 2:
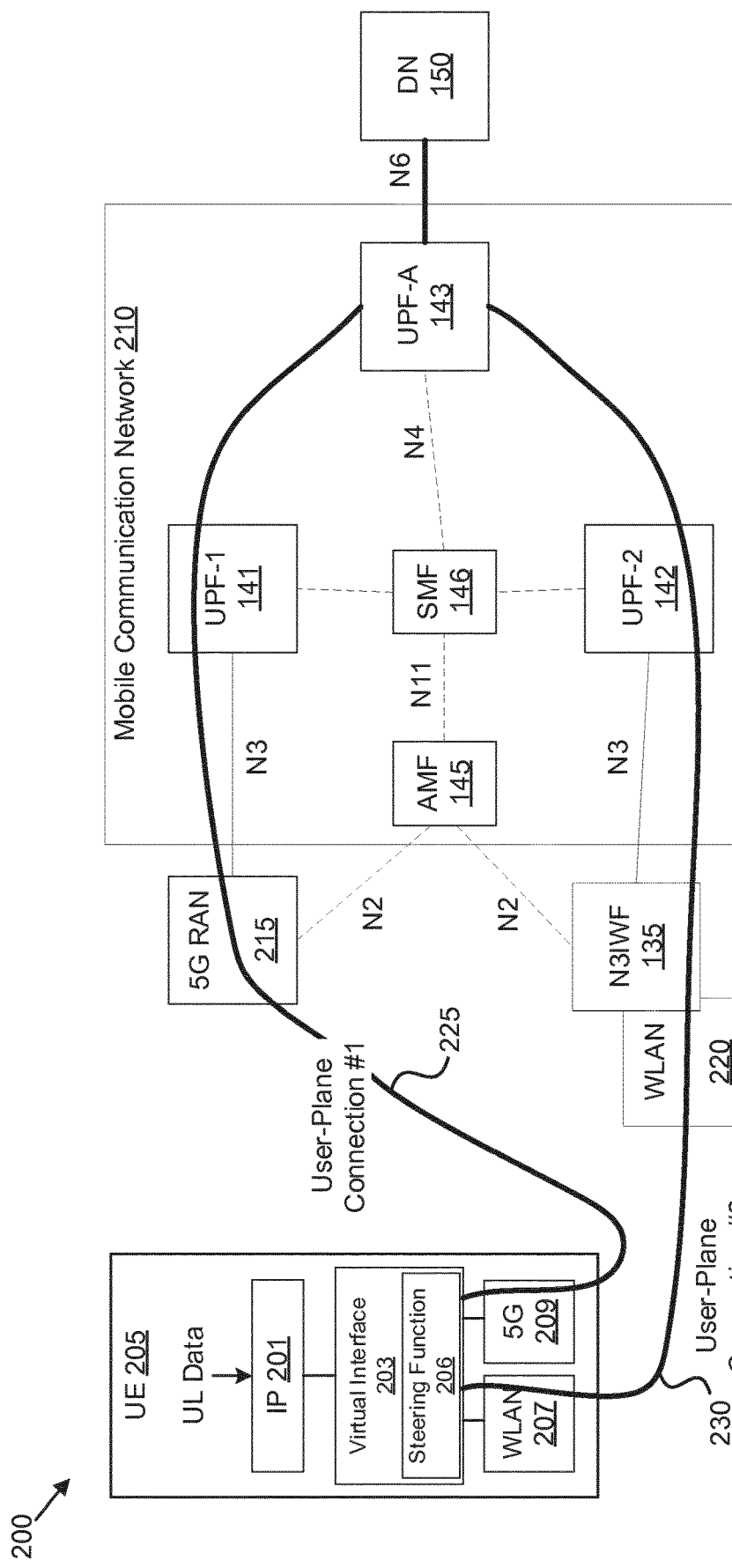
FIG. 2 is a block diagram illustrating one embodiment of a network architecture for steering a data packet to a specific user-plane connection of a multi-access data connection.

FIG. 2 depicts a network architecture 200 used for steering a data packet to a specific user-plane connection of a multi-access data connection, according to embodiments of the disclosure. The network architecture 200 may be a simplified embodiment of the wireless communication system 100. As depicted, the network architecture 200 includes a UE 205 that communicates with mobile communication network 210 over both a 5G RAN 215 and a WLAN 220, such as a Wi-Fi RAN. The 5G RAN 215 is one embodiment of the 3GPP access network 120 and the WLAN 220 is one embodiment of the non-3GPP access network 130, described above. The mobile communication network 210 is one embodiment of the core network 140, described above, and includes a first UPF 141, a second UPF 142, an anchor UPF 143, an AMF 145, and a SMF 146. The WLAN 220 accesses the mobile communication network via the N3IWF 135, which may be co-located with the WLAN 220, located in the mobile core network, or located outside both the WLAN 220 and the mobile core network, as described above. The N3IWF 135 communicates with the AMF 145 via an "N2" interface and with the second UPF 142 via an "N3" interface. The 5G RAN 215 communicates with the AMF 145 via an "N2" interface and with the first UPF 141 via an "N3" interface.

As depicted, the UE 205 includes a protocol stack containing an IP layer 201, a virtual interface layer 203, a WLAN interface 207, and a 5G radio interface 209. After sending the single request to establish a data connection (e.g., a MA-PDU session), as described herein, the UE 205 receives a request to set up a first data bearer for the data connection (corresponding to the first user-plane connection 225) over the 5G RAN 215 and a request to set up a second data bearer for the data connection (corresponding to the second user-plane connection 230) over the WLAN 220. The requests include one or more session identifiers included in the single request so that the UE 205 knows they are both for the same MA-PDU session.

Accordingly, the UE 205 establishes a multi-access data connection (here depicted as a MA-PDU session) that has two user-plane connections (e.g., child PDU sessions); here, a first user-plane connection 225 that utilizes the 5G radio interface 209 and the 5G RAN 215 and a second user-plane connection 230 that utilizes the WLAN interface 207 and the WLAN 220 (e.g., a public Wi-Fi hotspot). The two user-plane connections are linked in the UE in the "virtual interface" layer 203 which exposes a single IP interface to upper layers (e.g., the IP layer 201). Accordingly, the two user-plane connections share the same IP address and compose a multi-link data connection between the UE 205 and the UPF-A 143.

FIG. 2 shows a scenario with three UPFs: the first UPF 141 interfacing to 5G RAN 215, the second UPF 142 interfacing with N3IWF 135, and the anchor UPF 143. However, in other scenarios the UPFs 141, 142 may not be required, for example where it is possible to interface the anchor UPF 143 directly to the 5G RAN 215 and to the N3IWF 135.

In various embodiments, the virtual interface layer 203 includes a steering function 206 that determines over which of the user-plane connection a UL data packet (e.g., of a data flow associated with the MA-PDU session) is to be transmitted. Here, the steering function 206 accesses the set of traffic steering rules (e.g., contained in the ATSSS policy) and identifies a steering rule for the UL data packet. Here, a traffic filter in the steering rule is compared to various characteristics of the UL data packet to determine whether the steering rule applies. As a non-limiting example, a data packet may match the traffic filter based on a UE function (e.g., application or OS component) that generates the data packet, a protocol used by the data packet (e.g., TCP, UDP, etc.), a port associated with the data packet, and combinations thereof. As noted above, the set of traffic steering rules may be a prioritized list, such that the applicable rule for a data packet is the highest priority steering rule that matches the data packet.

In various embodiments, the UE 205 receives an ATSSS policy from the mobile communication network 210 during the establishment of the MA-PDU session. Here, the ATSSS policy may be created for the MA-PDU session, e.g., by a PCF (not shown) in the network. The ATSSS policy may then be transferred to the UE 205 for uplink traffic steering and to the UPF-A 143 for downlink traffic steering.

The ATSSS policy (e.g., the steering policy 110) includes a prioritized list of ATSSS rules and each ATSSS rule includes a steering mode that should be applied to the traffic matching this rule. For example, the ATSSS policy for a MA-PDU session may contain:

(First ATSSS rule (priority 1): [Traffic filter: Traffic of App-X; Steering mode: Active-Standby steering; Active access: 3GPP, Standby access: non-3GPP]); (Second ATSSS rule (priority 2): [Traffic filter: TCP traffic with destination IP address 10.10.0.1; Steering mode: Active-Standby steering; Active access: 3GPP, Standby access: None]); (Default ATSSS rule (least priority): [Traffic filter: All traffic; Steering mode: Active-Standby steering; Active access=non-3GPP, Standby access=3GPP]).

The first ATSSS rule steers the traffic of App-X to 3GPP access, if available; if not available, it steers the traffic to non-3GPP access. The second ATSSS rule steers the TCP traffic with destination IP address 10.10.0.1 to 3GPP access only. Since no standby access is defined, this traffic cannot be transferred over non-3GPP access, even when the 3GPP access becomes unavailable. The default ATSSS rule steers the rest of the traffic to non-3GPP, if available; if not available it is steered to 3GPP access. If more steering modes are supported, then more advanced ATSSS rules could be constructed and more advanced traffic steering strategies could be enforced, as illustrated in the below examples.

In a first example, if the operator has deployed a video streaming server at address 10.10.0.2, then the streaming traffic between the UE and this server could be load-balanced across 3GPP and non-3GPP access with the following ATSSS rule: (ATSSS rule (priority x): [Traffic filter: UDP traffic to IP address 10.10.0.2; Steering mode: Load-balanced steering; 3GPP access: 30%, non-3GPP access: 70%]). In a second example, if the network is to provide very small packet error rate (i.e. high reliability) when the UE communicates with an application server over TCP/port 1234, then the following ATSSS rule could be provisioned: (ATSSS rule (priority x): [Traffic filter: TCP traffic to port 1234; Steering mode: Redundant steering]).

In a third example, if all the traffic sent over a MA-PDU session should be transferred with the best possible performance, then the following ATSSS rule could be provisioned: (Default ATSSS rule: [Traffic filter: All traffic; Steering mode: Best-access steering]). In a fourth example, if all the traffic of a MA-PDU session should be offloaded to non-3GPP access but avoid congestion over non-3GPP access to severely impact the performance, then the following ATSSS rule could be provisioned: (Default ATSSS rule: [Traffic filter: All traffic; Steering mode: Priority-based steering; High-priority: non-3GPP, Low-priority: 3GPP]).

Figure 3:
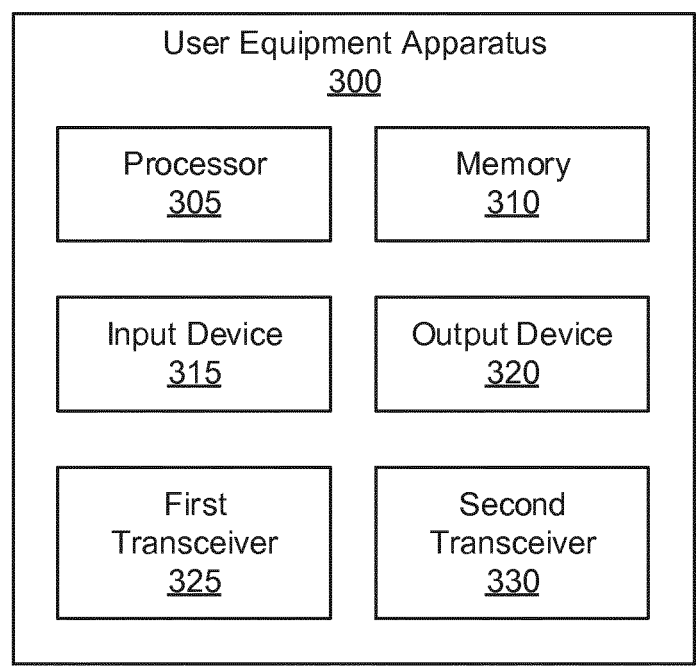
FIG. 3 is a schematic block diagram illustrating one embodiment of a user equipment apparatus for steering a data packet to a specific user-plane connection of a multi-access data connection.

FIG. 3 depicts one embodiment of a UE apparatus 300 that may be used for steering a data packet to a specific user-plane connection of a multi-access data connection, according to embodiments of the disclosure. The UE apparatus 300 may be one embodiment of the remote unit 105. Furthermore, the UE apparatus 300 may include a processor 305, a memory 310, an input device 315, a display 320, a first transceiver 325, and a second transceiver 330. The first transceiver 325 communicates with a mobile communication network (e.g., the mobile core network 140) over a first access network, while the second transceiver 330 communicates with the mobile communication network over a second access network. The first and second access networks facilitate communication between the mobile core network 140 and the UE apparatus 300. In one embodiment, the first access network is the 5G RAN 215 or other 3GPP access network 120 and the second access network is the WLAN 220 or other non-3GPP access network 130. In another embodiment, the second access network is the 5G RAN 215 or other 3GPP access network 120 and the first access network is the WLAN 220 or other non-3GPP access network 130. In other embodiments, the first access network and second access network may be other types of access networks, the first access network being a different type of access network than the second. Each transceiver 325, 330 may include at least one transmitter and at least one receiver. Additionally, the transceivers 325, 330 may support at least one network interface, such as an "Uu" interface used for communications between the remote unit 105 and the 3GPP access network 120.

The processor 305, in one embodiment, may include any known controller capable of executing computer-readable instructions and/or capable of performing logical operations. For example, the processor 305 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 305 executes instructions stored in the memory 310 to perform the methods and routines described herein. The processor 305 is communicatively coupled to the memory 310, the input device 315, the display 320, the first transceiver 325, and the second transceiver 330.

In some embodiments, the processor 305 receives, from a UE function running on the user equipment apparatus 300 (e.g., an application or OS component). In some embodiments, the request to establish a data connection indicates a first set of parameters. In such embodiments, the first set of parameters may include a DNN and/or S-NSSAI for the data connection. The processor 305 determines whether to establish the data connection as a multi-access data connection, e.g., based on the first set of parameters. In some embodiments, the processor 305 accesses a (e.g., pre-configured) connection policy (e.g., stored in memory 310) and compares the first set of parameters to one or more rules in the connection policy to determine whether to establish the data connection as a multi-access data connection.

The connection policy may indicate whether the user equipment apparatus 300 is to establish a multi-access data connection or a single-access data connection. Here, the connection policy may indicate, e.g., that "data connection requests having a first set or a second set or a third set of parameters should be established as multi-access data connections." As an example, the policy may say that "data connections to DNN=internet should be established with multiple accesses". In various embodiments, the processor 305 receives the connection policy from a network function in the mobile core network 140, such as the PCF 148.

Before requesting the multi-access data connection establishment, the user equipment apparatus 300 should be registered with the mobile communication network over both the first access and the second access. Accordingly, determining to establish the data connection as a multi-access data connection may trigger mobile network registration via one of the first access or the second access. As discussed here, a multi-access data connection includes at least a first user-plane connection over the first access network and a second user-plane connection over the second access network. In various embodiments, the first access network is a 3GPP radio access network and the second access network is a non-3GPP access network, such as a wireless local area network.

Additionally, the processor 305 receives a plurality of steering rules, such as an ATSSS policy. Note that the plurality of steering rules may be specific to a data network (e.g., an endpoint of the multi-access data connection), specific to the user equipment apparatus 300 (e.g., based on a subscription and/or on a roaming status of the user equipment apparatus 300), specific to a combination of data network and user equipment apparatus 300, or the like. In some embodiments, each steering rule includes a traffic filter and a steering mode selected from a plurality of steering modes (e.g., traffic steering strategies). Here, different steering rules may have different steering modes, such that a first steering rule has a different steering mode than a second steering rule.

In other embodiments, the plurality of steering rules includes a default rule that indicates a steering mode and a prioritized list of non-default rules that indicate a preferred access type and/or a forbidden access type for traffic matching the rule. In various embodiments, the plurality of steering modes includes: a policy-based steering mode, a priority-based steering mode, an active-standby steering mode, a best-access steering mode, a redundant steering mode, and a load-balancing steering mode. These steering modes are discussed in greater detail below, with reference to FIGS. 5A-5F.

At some point, the UE function (e.g., running on the processor 305) generates a first data packet to be sent over the multi-access data connection. Accordingly, the processor 305 identifies a first steering rule that applies to the first data packet from the plurality of steering rules. As discussed herein, the first steering rule may be a highest priority rule that matches the data packet. Based on the first steering rule, the processor 305 selects either the first user-plane connection or the second user-plane connection and controls the corresponding transceiver to transmit the first data packet over the selected user-plane connection.

In certain embodiments, the plurality of steering rules is received during establishment of the multi-access data connection. For example, the multi-access data connection may be a MA-PDU session. Here, the processor 305 may send a first message (e.g., a PDU Session Establishment Request message) to the mobile communication network over, e.g., the first access network, the first message requesting establishment of a PDU session over the first access network and the second access network (e.g., requesting a MA-PDU). Moreover, the processor 305 may receive a second message (e.g., a PDU Session Establishment Accept message) from the mobile communication network that includes the plurality of steering rules.

In some embodiments, the user equipment apparatus 300 is registered with the mobile communication network via the first access network prior to the request to establish a data connection. In such embodiments, the processor 305 also registers with the mobile communication network over the second access network in response to determining to establish the multi-access data connection.

In various embodiments, the processor 305 receives a request to establish a data connection with the mobile communication network and determines to establish the data connection as a multi-access data connection having a first user-plane connection over the first access network and a second user-plane connection over the second access network. Moreover, the processor 305 sends a first message requesting establishment of the multi-access data connection and receives a second message that includes a plurality of steering rules, including a default steering rule. Here, the default steering rule indicates a steering mode selected from a plurality of steering modes. The processor 305 generates a first data packet to be sent over the multi-access data connection, identifies a first steering rule that applies to the first data packet from the plurality of steering rules, and transmits the first data packet over a selected one of the first user-plane connection and the second user-plane connection. Here, the selection based on the first steering rule.

In certain embodiments, the plurality of steering rules includes a prioritized list of non-default rules. In one embodiment, each non-default rule may specify one of the first access network and the second access network and indicate whether the specified access is preferred or forbidden. Moreover, the default steering mode may be one of: a priority-based steering mode, an active-standby steering mode, a best-access steering mode, a redundant steering mode, and a load-balancing steering. In another embodiment, one or more of the non-default rules may also include a steering mode.

The memory 310, in one embodiment, is a computer readable storage medium. In some embodiments, the memory 310 includes volatile computer storage media. For example, the memory 310 may include a RAM, including dynamic RAM ("DRAM"), synchronous dynamic RAM ("SDRAM"), and/or static RAM ("SRAM"). In some embodiments, the memory 310 includes non-volatile computer storage media. For example, the memory 310 may include a hard disk drive, a flash memory, or any other suitable non-volatile computer storage device. In some embodiments, the memory 310 includes both volatile and non-volatile computer storage media. In some embodiments, the memory 310 stores data relating to steering a data packet to a specific user-plane connection of a multi-access data connection, for example storing connection policies, ATSSS policies, PDU Session IDs, and the like. In certain embodiments, the memory 310 also stores program code and related data, such as an operating system ("OS") or other controller algorithms operating on the user equipment apparatus 300 and one or more software applications.

The input device 315, in one embodiment, may include any known computer input device including a touch panel, a button, a keyboard, a stylus, a microphone, or the like. In some embodiments, the input device 315 may be integrated with the output device 320, for example, as a touchscreen or similar touch-sensitive display. In some embodiments, the input device 315 includes a touchscreen such that text may be input using a virtual keyboard displayed on the touchscreen and/or by handwriting on the touchscreen. In some embodiments, the input device 315 includes two or more different devices, such as a keyboard and a touch panel.

The output device 320, in one embodiment, may include any known electronically controllable display or display device. The output device 320 may be designed to output visual, audible, and/or haptic signals. In some embodiments, the output device 320 includes an electronic display capable of outputting visual data to a user. For example, the output device 320 may include, but is not limited to, an LCD display, an LED display, an OLED display, a projector, or similar display device capable of outputting images, text, or the like to a user. As another, non-limiting, example, the output device 320 may include a wearable display such as a smart watch, smart glasses, a heads-up display, or the like. Further, the output device 320 may be a component of a smart phone, a personal digital assistant, a television, a table computer, a notebook (laptop) computer, a personal computer, a vehicle dashboard, or the like.

In certain embodiments, the output device 320 includes one or more speakers for producing sound. For example, the output device 320 may produce an audible alert or notification (e.g., a beep or chime). In some embodiments, the output device 320 includes one or more haptic devices for producing vibrations, motion, or other haptic feedback. In some embodiments, all or portions of the output device 320 may be integrated with the input device 315. For example, the input device 315 and output device 320 may form a touchscreen or similar touch-sensitive display. In other embodiments, all or portions of the output device 320 may be located near the input device 315.

Figure 4:
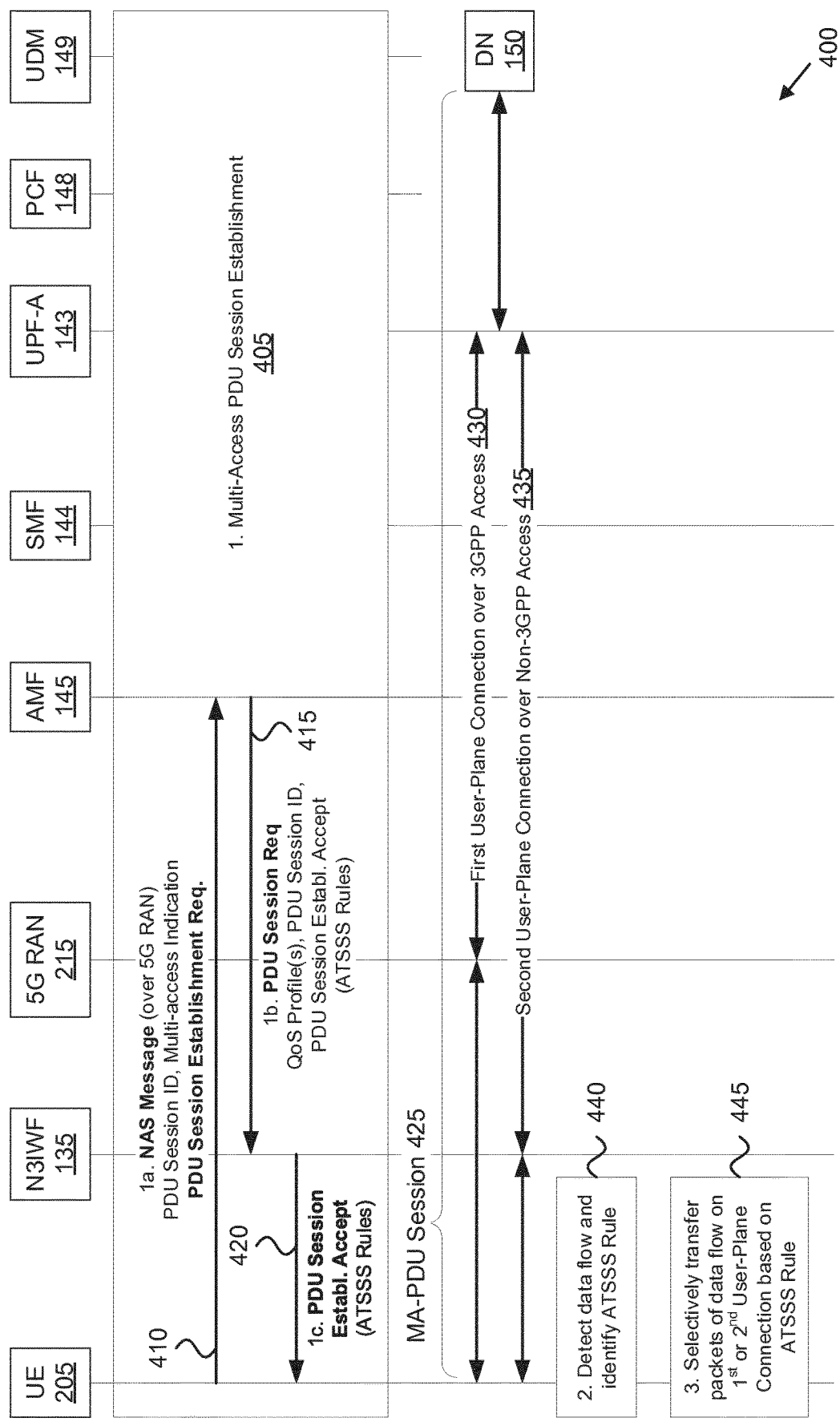
FIG. 4 is a schematic block diagram illustrating one embodiment of a network procedure for steering a data packet to a specific user-plane connection of a multi-access data connection.

FIG. 4 depicts a network procedure 400 for provisioning a UE 205 with a unique instance of a UE-ETDF 156, according to embodiments of the disclosure. The network procedure 400 involves the UE 205, N3IWF 135, 5G RAN 215, AMF 145, SMF 144, UPF-A 143, PCF 148, UDM 149, and the data network ("DN") 150. The network procedure 400 begins with the UE establishing a Multi-Access PDU ("MA-PDU") Session (see block 405). Here, the MA-PDU Session establishment includes the UE 205 sending a NAS message to the AMF 145 which includes a "PDU Session Establishment Request" (see communication 410).

In the embodiments of FIG. 4, the NAS message is sent over the 5G RAN 215 (e.g., the 3GPP access network), but in other embodiments the NAS message may be sent over the non-3GPP access network. In certain embodiments, the UE 205 indicates that it wants to establish a MA-PDU over both the 3GPP and non-3GPP access networks by including within the NAS message a PDU Session identification and a specific multi-access indication. The NAS message sent by the UE 205 may also include other information, such as the requested DNN (Data Network Name), the requested slice type or S-NSSAI, etc.

The AMF 145 selects an SMF (here the SMF 146) and sends a SM Request that includes the "PDU Session Establishment Request" received from the UE 205. The SMF 146, in turn, selects a PCF (here PCF 148) and establishes a new session with the selected PCF 148. In various embodiments, the PCF 148 provides ATSSS rules to the SMF 146, which rules are passed to the AMF 145. Additionally, the SMF 146 sends a Session Establishment Request to the UPF-A 143 to begin the establishment of the first user-plane connection and the second user-plane connection for the MA-PDU Session.

The AMF 145 sends a PDU Session Request message to the N3IWF 135 (see communication 415) in order to establish the second user-plane connection over non-3GPP access. Here, the PDU Session Request message includes the PDU Session identification included in the earlier NAS message. Additionally, the PDU Session Request message includes a PDU Session Establishment Accept message, the PDU Session Establishment Accept message including the ATSSS rules. In certain embodiments, the PDU Session Request message also includes one or more QoS Profiles to be applied over the MA-PDU Session. The N3IWF 135 then transmits the PDU Session Establishment Accept message to UE 205 including the ATSSS rules (see communication 420). This concludes the establishment of the second user-plane connection.

To establish the first user-plane connection over 3GPP access, the AMF 145 sends a PDU Session Request message to the 5G RAN 215 (not shown in FIG. 4). The 5G RAN 215 then transmits the PDU Session Establishment Accept message to UE including the ATSSS rules, if the ATSSS rules have not been sent to UE already (e.g. with communication 420). At this point, a MA-PDU Session 425 is established between the UE 205 and the UPF-A 143. Here, the MA-PDU Session 425 includes a first user-plane connection 430 over the 3GPP access network and a second user-plane connection 435 over the non-3GPP access network.

After establishment of the MA-PDU Session 425, the UE 205 detects generation of a data flow that uses the MA-PDU Session 425 and identifies an ATSSS rule applicable to the data flow (see block 440). Moreover, the UE 205 selectively transfers packets of the data flow on either the first user-plane connection 430 or the second user-plane connection 435 based on the applicable ATSSS rule (see block 445). In various embodiments, the UE 205 determines a steering mode for the data flow from the ATSSS. Thereafter, the UE 205 routes packets of the data flow using the determined steering mode. As discussed in further detail below, the steering mode may be a policy-based steering mode, a priority-based steering mode, an active-standby steering mode, a best-access steering mode, a redundant steering mode, and/or a load-balancing steering mode. One example of the UE 205 performing block 440-445 is described below with reference to FIG. 6. Another example of the UE 205 performing block 440-445 is described below with reference to FIG. 7.

Figure 5A:
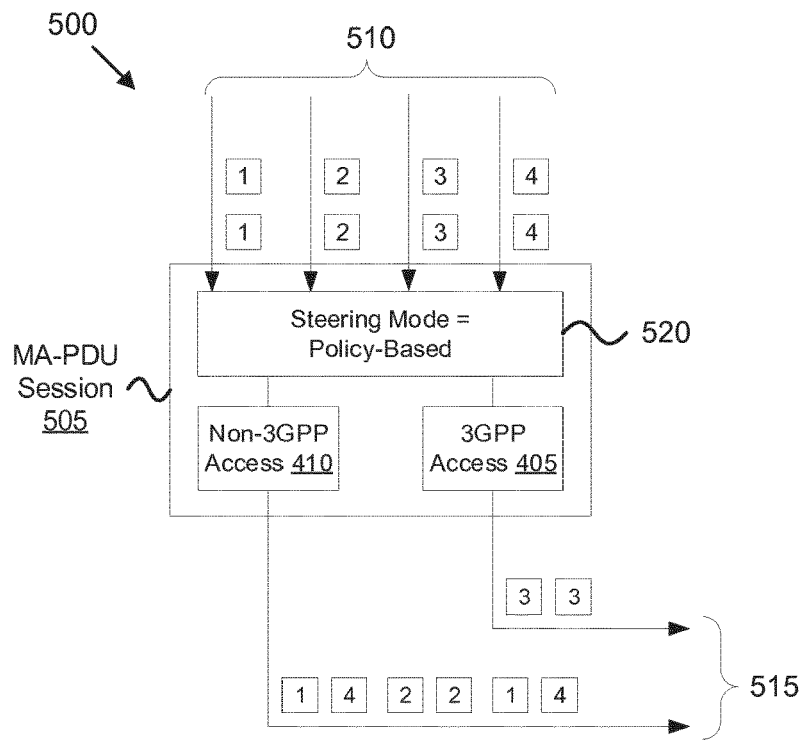
FIG. 5A is a block diagram illustrating a first embodiment of steering mode for steering traffic on a multi-access data connection.

FIG. 5A depicts a first steering mode 500 for steering traffic on a multi-access data connection, according to embodiments of the disclosure. The first steering mode 500 is implemented by a UE having established a MA-PDU Session 505. Here, the UE has a plurality of input UL data packets 510 to be transferred via the MA-PDU Session 505. Depicted are four traffic flows, corresponding to packets '1', '2', '3', and '4'.

As depicted, the first steering mode 500 is a "Policy-Based" traffic steering strategy. Here, a steering function 520 implements the "Policy-Based" steering strategy to selectively route the input UL data packets 510 via either the 3GPP access 405 or the non-3GPP access 410. The output UL data packets 515 are transferred to the mobile communication network over the selected access networks.

For the "Policy-Based" steering strategy (first steering mode 500), a clearly defined routing policy (e.g., an ATSSS) policy is used to determine how to steer the traffic. This policy, assigns selected data flows to specific accesses. The complexity involved in the first steering mode 500 is relatively small. For example, a data flow matching the traffic filter "UDP traffic to port 5060" may be assigned to the 3GPP access 405. As another example, a data flow matching the traffic filter "App-X" may be assigned to the Non-3GPP access 410.

In the depicted embodiment, a policy rule specifies that traffic of the data flow '3' is assigned to the 3GPP access 405, while the other data flows are assigned to the non-3GPP access 410. Note that traffic may be switched from one access to another by changing the ATSSS policy, or by using validity conditions in the policy. One example of an ATSSS rule with a validity condition is "Assign traffic of App-X to non-3GPP access 410, when the UE is located in area Y, and to 3GPP access 405 in all other areas." Note that in the policy-based steering mode, the network operator may assign selected traffic to specific accesses.

Figure 5B:
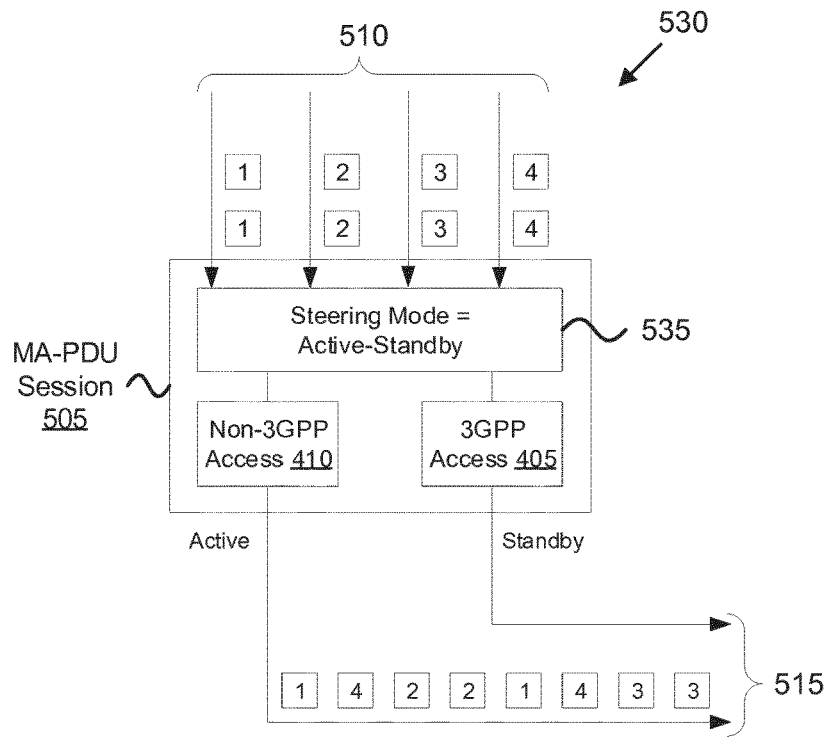
FIG. 5B is a block diagram illustrating a second embodiment of steering mode for steering traffic on a multi-access data connection.

FIG. 5B depicts a second steering mode 530 for steering traffic on a multi-access data connection, according to embodiments of the disclosure. The second steering mode 530 is implemented by a UE having established a MA-PDU Session 505. Here, the UE has a plurality of input UL data packets 510 to be transferred via the MA-PDU Session 505. Depicted are four traffic flows, corresponding to packets '1', '2', '3', and '4'.

As depicted, the second steering mode 530 is a "Active-Standby" traffic steering strategy. Here, a steering function 535 implements the "Active-Standby" steering strategy to selectively route the input UL data packets 510 via either the 3GPP access 405 or the non-3GPP access 410. The output UL data packets 515 are transferred to the mobile communication network over the selected access networks.

For the "Active-Standby" steering strategy (second steering mode 530), all traffic of the MA-PDU session 505 is sent to one access only, which is called the "active" access. The other access serves as a "standby" access and takes traffic (e.g., all the traffic) only when the active access becomes unavailable. When the active access becomes available again, all traffic is transferred to the active access. In the depicted embodiment, no traffic is steered to the "Standby" access (here, the 3GPP access 405) due to the 'Active' access (here the non-3GPP access 410) being available.

For example, applying "Active-Standby" steering to TCP/port 1234 traffic means that this traffic is to be transferred on the Active access, if available, or on the Standby access, when the Active access is unavailable. In certain embodiments, a traffic steering rule indicating the second steering mode 530 may define 'no Standby access' in which case the traffic is restricted to one access only (e.g., the active and it is forbidden on the other access.

The complexity involved in the second steering mode 530 is relatively small. Beneficially, the "Active-Standby" steering strategy allows the MA-PDU Session 505 to provide enhanced session continuity as compared to other steering modes. In the depicted embodiment, the non-3GPP access 410 is the "active" access, while the 3GPP access 405 is the "standby" access. In other embodiments, the 3GPP access 405 may be the "active" access, with the non-3GPP access 410 being the "standby" access.

Figure 5C:
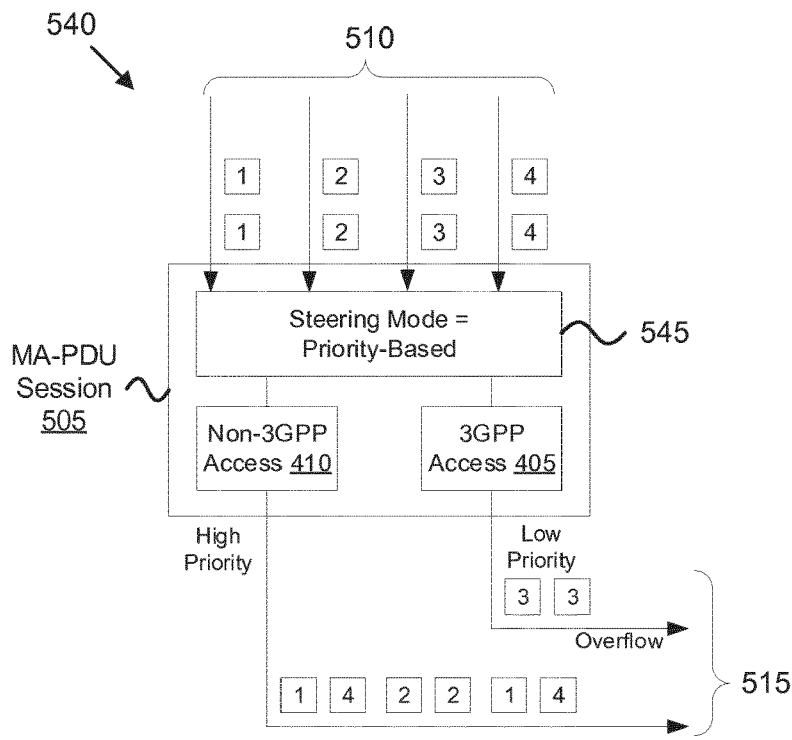
FIG. 5C is a block diagram illustrating a third embodiment of steering mode for steering traffic on a multi-access data connection.

FIG. 5C depicts a third steering mode 540 for steering traffic on a multi-access data connection, according to embodiments of the disclosure. The third steering mode 540 is implemented by a UE having established a MA-PDU Session 505. Again, the UE has a plurality of input UL data packets 510 to be transferred via the MA-PDU Session 505. Depicted are four traffic flows, corresponding to packets '1', '2', '3', and '4'.

As depicted, the third steering mode 540 is a "Priority-Based" traffic steering strategy. Here, a steering function 545 implements the "Priority-Based" steering strategy to selectively route the input UL data packets 510 via either the 3GPP access 405 or the non-3GPP access 410. The output UL data packets 515 are transferred to the mobile communication network over the selected access networks.

For the "Priority-Based" steering strategy (third steering mode 540), the two accesses 405, 410 are assigned a priority, e.g., during the establishment of the MA-PDU session 505. All traffic of the MA-PDU session 505 is sent to the high priority access. When congestion arises on the high priority access, new data flows (the "overflow" traffic) are sent to the low priority access. If needed, the priorities of the accesses may be changed during the lifetime of the MA-PDU session 505.

Beneficially, the "Priority-Based" steering strategy allows the MA-PDU Session 505 provides enhanced continuity and increased bandwidth. However, note that the complexity involved in the third steering mode 540 is higher than the first and second steering modes 500, 530. Here, the third steering mode 540 requires UE and/or the network to determine when congestion arises on the high priority access.

In the depicted embodiment, the 3GPP access 405 is assigned "low priority", while the non-3GPP access 410 is assigned "high priority". Here, traffic of data flow '3' is overflow traffic that is routed via the "low priority" 3GPP access 405, e.g., due to congestion on the non-3GPP access 410.

Figure 5D:
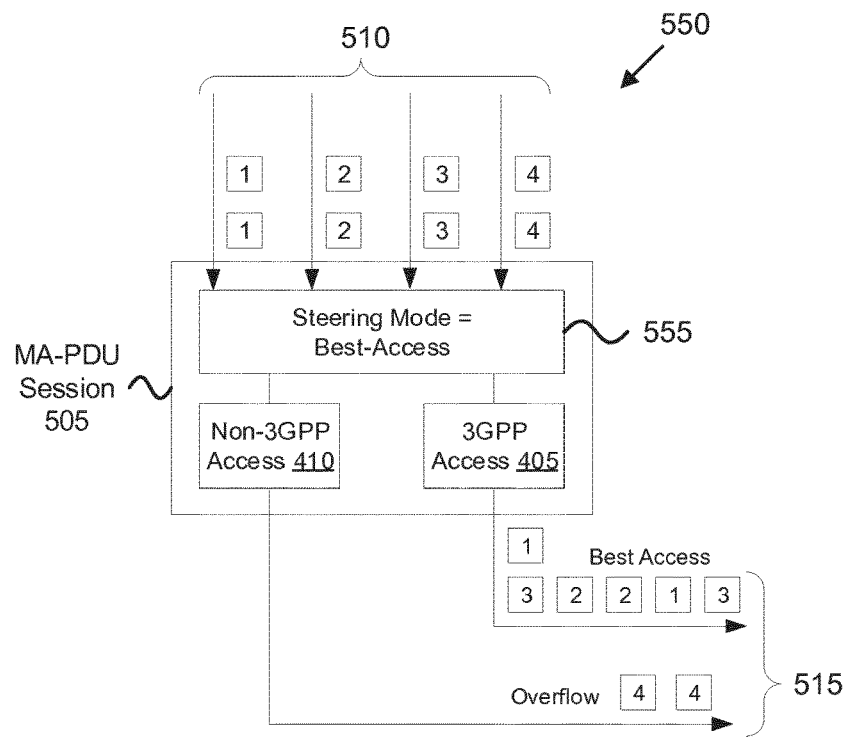
FIG. 5D is a block diagram illustrating a fourth embodiment of steering mode for steering traffic on a multi-access data connection.

FIG. 5D depicts a fourth steering mode 550 for steering traffic on a multi-access data connection, according to embodiments of the disclosure. The fourth steering mode 550 is implemented by a UE having established a MA-PDU Session 505. Here, the UE has a plurality of input UL data packets 510 to be transferred via the MA-PDU Session 505. Depicted are four traffic flows, corresponding to packets '1', '2', '3', and '4'.

As depicted, the fourth steering mode 550 is a "Best-Access" traffic steering strategy. Here, a steering function 555 implements the "Best-Access" steering strategy to selectively route the input UL data packets 510 via either the 3GPP access 405 or the non-3GPP access 410. The output UL data packets 515 are transferred to the mobile communication network over the selected access networks.

The "Best-Access" steering strategy (fourth steering mode 550), all traffic of the MA-PDU session 505 is sent to the access that provides the best performance (e.g., the smallest round-trip-time ("RTT")). In this case, the "preferred" access is not fixed (as opposed to a "Priority-Based" steering strategy), but can change dynamically. When congestion arises on the "preferred" access (e.g., having the best performance), then new data flows (the "overflow" traffic) are sent to the other access.

Beneficially, the "Best-Access" steering strategy allows the MA-PDU Session 505 provides enhanced continuity and increased bandwidth. Also, the "Best-Access" steering strategy provides improved performance as compared to the "Priority-Based" steering strategy. However, note that the complexity involved in the fourth steering mode 540 is relatively high as the third steering mode 540 requires UE and/or the network to estimate the best-performing access.

In the depicted embodiment, the 3GPP access 405 is the better performing access, while overflow is routed via the non-3GPP access 410. Here, traffic of data flow '4' is overflow traffic that is routed via the lesser performing non-3GPP access 410, e.g., due to congestion on the 3GPP access 405.

Figure 5E:
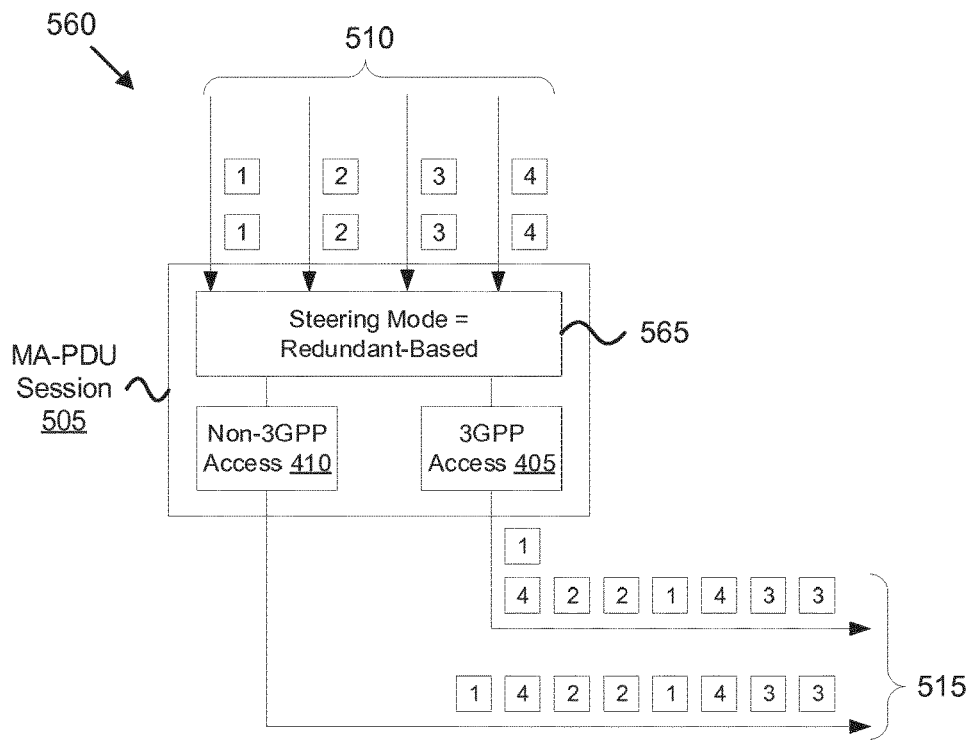
FIG. 5E is a block diagram illustrating a fifth embodiment of steering mode for steering traffic on a multi-access data connection.

FIG. 5E depicts a fifth steering mode 560 for steering traffic on a multi-access data connection, according to embodiments of the disclosure. The fifth steering mode 560 is implemented by a UE having established a MA-PDU Session 505. Here, the UE has a plurality of input UL data packets 510 to be transferred via the MA-PDU Session 505. Depicted are four traffic flows, corresponding to packets '1', '2', '3', and '4'.

As depicted, the fifth steering mode 560 is a "Redundant" traffic steering strategy. Here, a steering function 565 implements the "Redundant" steering strategy to route the input UL data packets 510 via the 3GPP access 405 and the non-3GPP access 410. The output UL data packets 515 are transferred to the mobile communication network over the selected access networks.

For the "Redundant" steering strategy (fifth steering mode 560), all data flows are transmitted on both accesses in order to increase reliability. Here, the UE duplicates each received packet, sending one copy over the 3GPP access 405 and the other over the non-3GPP access 410. Beneficially, the fifth steering mode allows the MA-PDU Session 505 to provide high data reliability (e.g., a very small, packet error rate). However, this fifth steering mode requires high complexity because the receiving side must be able to detect and discard duplicate packets. For this purpose, the sending side (UE) may append sequence numbers to the transmitted packets.

Also, to provide in-sequence delivery the receiving side must be able to buffer and re-order the received packets.

Figure 5F:
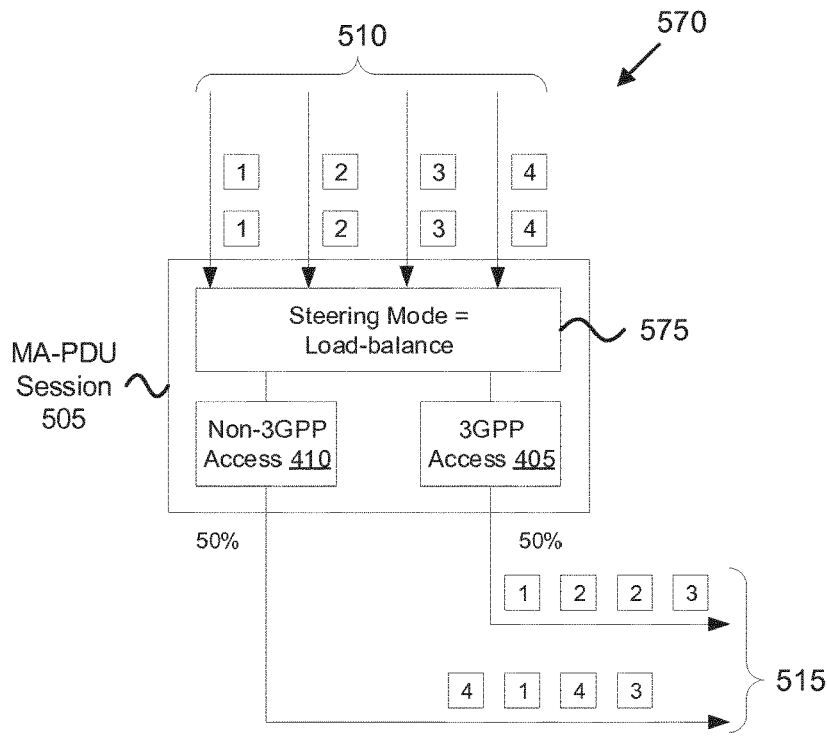
FIG. 5F is a block diagram illustrating a sixth embodiment of steering mode for steering traffic on a multi-access data connection.

FIG. 5F depicts a sixth steering mode 570 for steering traffic on a multi-access data connection, according to embodiments of the disclosure. The sixth steering mode 570 is implemented by a UE having established a MA-PDU Session 505. Here, the UE has a plurality of input UL data packets 510 to be transferred via the MA-PDU Session 505. Depicted are four traffic flows, corresponding to packets '1', '2', '3', and '4'.

As depicted, the sixth steering mode 570 is a "Load-Balance" traffic steering strategy. Here, a steering function 575 implements the "Load-Balance" steering strategy to selectively route the input UL data packets 510 via either the 3GPP access 405 or the non-3GPP access 410. The output UL data packets 515 are transferred to the mobile communication network over the selected access networks.

For the "Load-Balance" steering strategy (sixth steering mode 570), each access receives a percentage of the data flows transmitted via the MA-PDU session 505. Essentially, each access is assigned a weight factor (50% in the depicted embodiment) and receives an amount of traffic corresponding to this factor. The complexity involved in the sixth steering mode 570 is relatively small as there is no need to assess the transmission performance on every access. Beneficially, the sixth steering mode allows the MA-PDU Session 505 to provide bandwidth aggregation with a certain load balancing ratio.

In the depicted embodiment, traffic is split in a 50/50 load balancing ratio between the 3GPP access 405 and the non-3GPP access 410. This causes the traffic to be evenly split between the 3GPP access 405 and the non-3GPP access 410. However, in other embodiments, another load balancing ratio may be implemented. For example, in an 80/20 load-balancing, approximately 80% of the overall traffic is sent on one access and 20% on the other access.

While each FIGS. 5A-5F show the MA-PDU Session 505 implementing a single steering mode, in other embodiments, the MA-PDU Session 505 uses a plurality of steering modes. As described here, each data flow of the MA-PDU Session 505 may be matched to an ATSSS rule, with different ATSSS rules implementing different one of the steering modes depicted in FIGS. 5A-5F.

Figure 6:
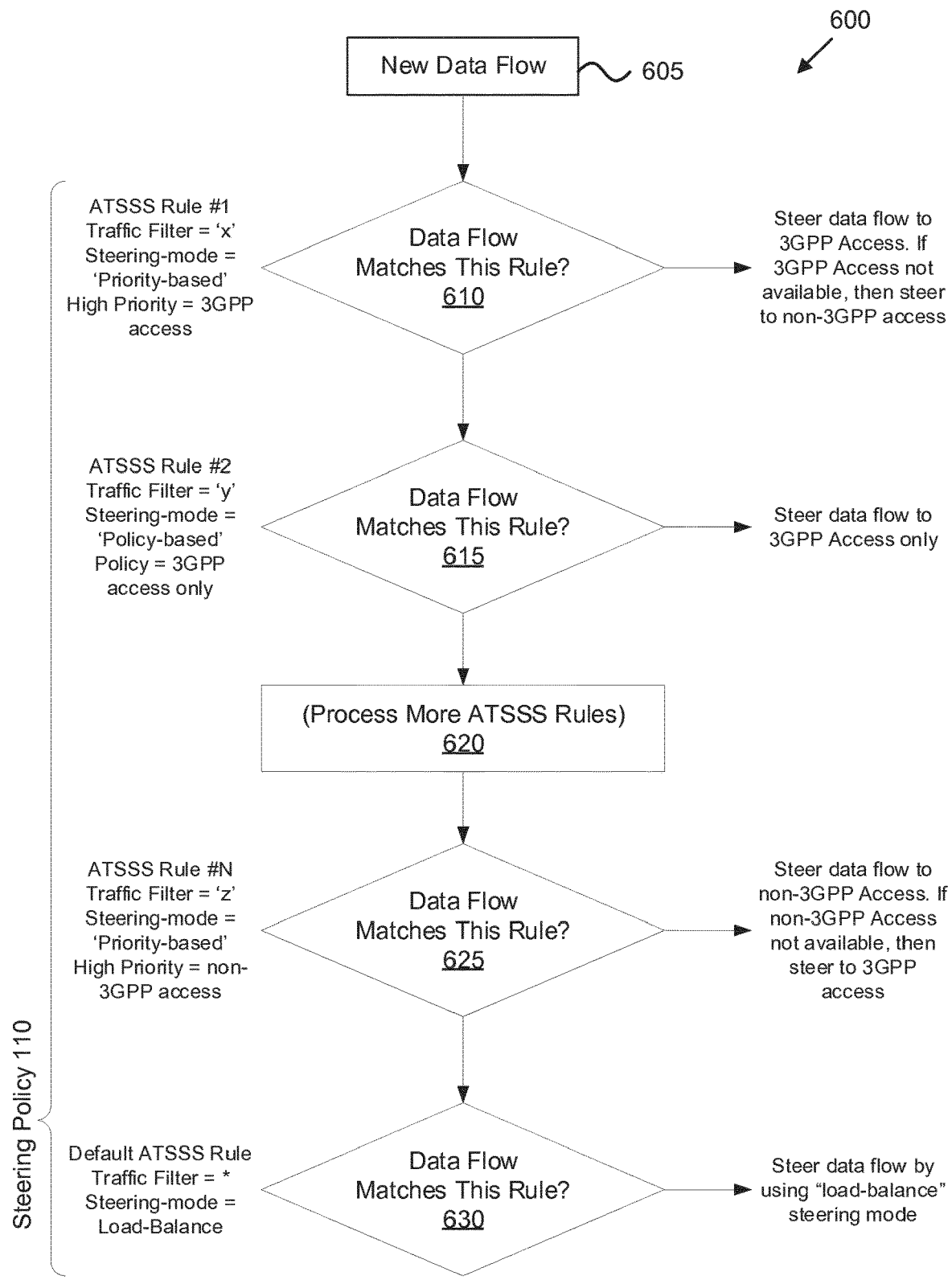
FIG. 6 is a block diagram illustrating one embodiment of a procedure for steering a data flow using multi-access ATSSS rules.

FIG. 6 depicts a first procedure 600 for steering a data flow using multi-access ATSSS rules. Here, the first procedure 600 is implemented by a remote unit, such as the remote unit 105, the UE 205, and/or the user equipment apparatus 300. In various embodiments, the first procedure 600 may be implemented by the steering function, such as the steering function 206.

The first procedure 600 for traffic steering within a MA-PDU session supports a combination of the steering modes described above. Accordingly, the first procedure 600 may be used to enable the following steering strategies: 1) Steer the traffic of App-X to non-3GPP access and steer all other traffic with "priority-based steering"; 2) Steer the UDP traffic on port 5060 to 3GPP access and steer all other traffic with "active-standby steering"; 3) Steer the traffic of App-Y to non-3GPP access when the UE is located in area Z, and steer all other traffic with "50/50 load-balance steering"; and/or 4) Steer all traffic with "best-access steering".

Note that the remote unit receives from the network (e.g., during the establishment of the MA-PDU session) a prioritized list of one or more ATSSS rules (e.g., forming the steering policy 110). In various embodiments, each ATSSS rule matches specific traffic (e.g., "all TCP traffic on port 80", "all traffic of App-X", etc.) and indicates a steering mode for the matching traffic. In various embodiments, a non-default ATSSS rule may indicate "priority-based steering" with high priority for the preferred access and low priority for the non-preferred access. Alternatively, a non-default ATSSS rule may indicate "policy-based steering" with a policy rule assigning matching traffic to the permitted access type and/or a forbidden access type. Moreover, a default ATSSS rule indicates a steering mode. In various embodiments, the default ATSSS rule indicates a different steering mode than one or more of the non-default ATSSS rules. While FIG. 6 shows specific steering modes for the ATSSS rules, note that any type of steering mode may be used in both the non-default ATSSS rules and in the default ATSSS rule.

As depicted, the first procedure 600 begins as a new data flow 605 is identified. Here, the ATSSS rules are accessed and characteristics of the data flow 605 are compared to the ATSSS rules to find a matching rule. At step 610, the data flow 605 is compared to the first ATSSS rules (e.g., the highest ranked ATSSS rule). Here, the first ATSSS rule has a traffic filer 'x' and a 'priority-based' steering mode, with the 3GPP access 405 the indicated high-priority access. Thus, if characteristics (e.g., originating application, transport protocol, port number, etc.) of the data flow 605 match 'x', then the remote unit steers the data flow 605 to the 3GPP access 405. If the 3GPP access 405 is not available, then the data flow 605 will be steered to the non-3GPP access 410. However, if the characteristics of the data flow 605 do not match 'x', then the next ATSSS rule is considered.

At step 615, the data flow 605 is compared to the second ATSSS rules (e.g., the next-highest ranked ATSSS rule). Here, the first ATSSS rule has a traffic filer 'y' and a 'policy-based' steering mode, with the policy allowing transmission via the 3GPP access 405 only. Thus, if characteristics (e.g., originating application, transport protocol, port number, etc.) of the data flow 605 match 'y', then the remote unit steers the data flow 605 to the 3GPP access 405. If the 3GPP access 405 is not available, then the data flow 605 cannot be transmitted. However, if the characteristics of the data flow 605 do not match 'y', then the next ATSSS rule is considered.

As depicted, the steering policy 110 may include N number of non-default ATSSS rules. The first procedure 600 includes processing more ATSSS rules 620 (e.g., assuming the data flow 605 does not match the traffic filter of any previously considered ATSSS rules).

At step 625, the data flow 605 is compared to the Nth ATSSS rules (e.g., the lowest ranked non-default ATSSS rule). Here, the Nth ATSSS rule has a traffic filer 'z' and a 'priority-based' steering mode, with the non-3GPP access 410 being the indicated high-priority access. Thus, if characteristics (e.g., originating application, transport protocol, port number, etc.) of the data flow 605 match 'z', then the remote unit steers the data flow 605 to the non-3GPP access 410. If the non-3GPP access 410 is not available, then the data flow 605 will be steered to the 3GPP access 405. However, if the characteristics of the data flow 605 do not match 'x', then the next ATSSS rule (e.g., the default rule) is considered.

At step 630, the data flow 605 is compared to the default ATSSS rules (e.g., the lowest ranked ATSSS rule). Note here that the first ATSSS rule uses wildcard traffic filer (e.g., '*') so that it will apply to all data flows. Because the default rule is the lowest priority ATSSS rule, the default rule will only be selected if no other ATSSS has a traffic filter matching the characteristics of the data flow 605.

Here, the default ATSSS rule has a load-balance' steering mode. In certain embodiments, the ATSSS rule will also indicate the load-balancing ratio. However, in other embodiments the load-balancing ratio is predetermined. Thus, if characteristics (e.g., originating application, transport protocol, port number, etc.) of the data flow 605 do not match any other ATSSS rule, then the remote unit steers the data flow 605 to either the 3GPP access 405 or the non-3GPP access 410, using load-balancing. The first procedure 600 ends.

Figure 7:
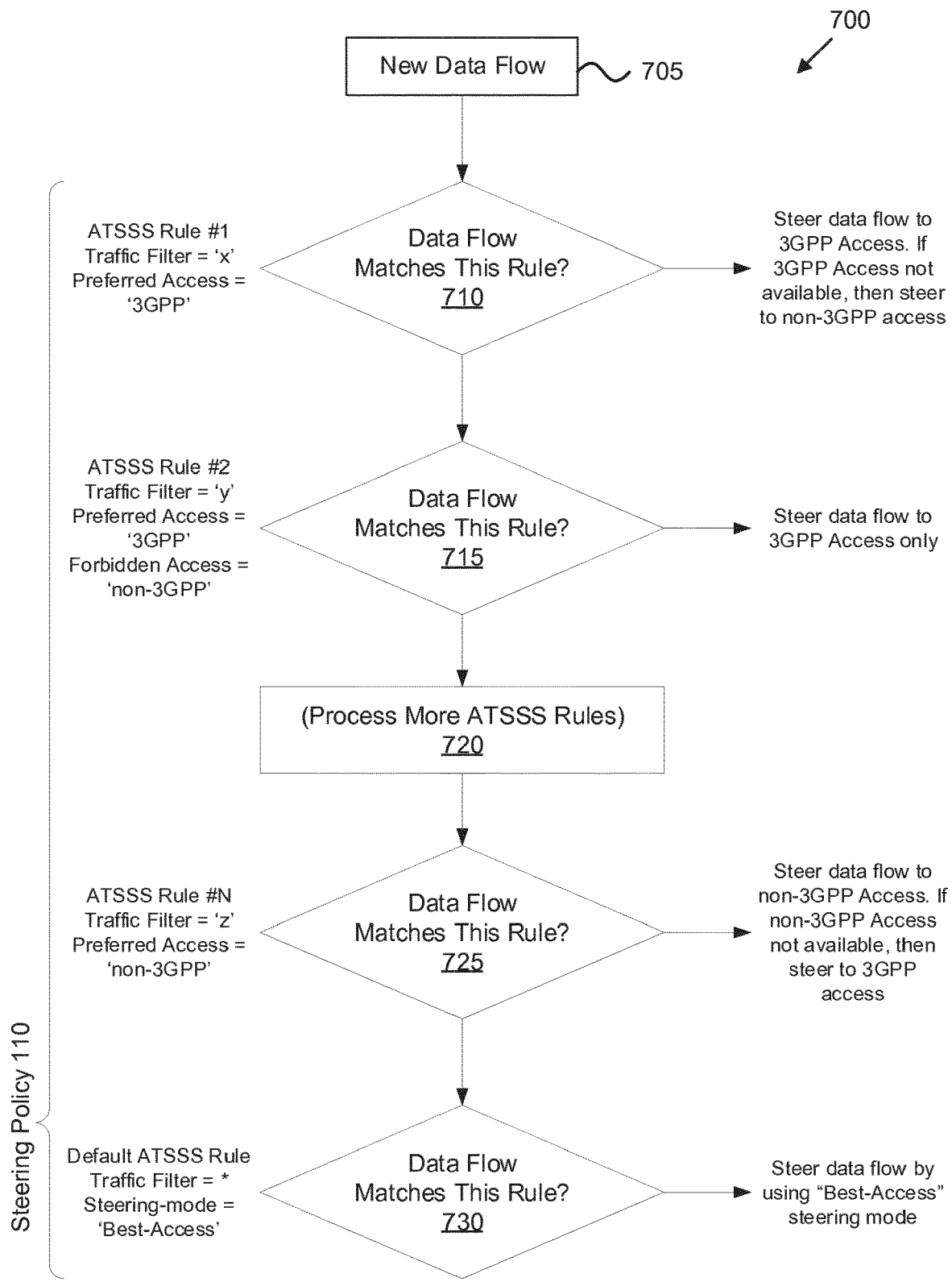
FIG. 7 is a block diagram illustrating another embodiment of a procedure for steering a data flow using multi-access ATSSS rules.

FIG. 7 depicts a second procedure 700 for steering a data flow using multi-access ATSSS rules. Here, the second procedure 700 is implemented by a remote unit, such as the remote unit 105, the UE 205, and/or the user equipment apparatus 300. In various embodiments, the second procedure 700 may be implemented by the steering function, such as the steering function 206.

The second procedure 700 for traffic steering within a MA-PDU session supports steering defined traffic by using configured policy rules (e.g., 'policy-based' steering) and steering the rest of the traffic by using any other steering mode, such as one of the best-access steering mode, as depicted. In other words, the second procedure 700 supports a combination of "policy-based steering" and another type of steering mode. Accordingly, the second procedure 700 may be used to enable the following steering strategies: 1) Steer the traffic of App-X to non-3GPP access and steer all other traffic with "priority-based steering"; 2) Steer the UDP traffic on port 5060 to 3GPP access and steer all other traffic with "active-standby steering"; 3) Steer the traffic of App-Y to non-3GPP access when the UE is located in area Z, and steer all other traffic with "50/50 load-balance steering"; and/or 4) Steer traffic with "best-access steering".

Note that the remote unit receives from the network (e.g., during the establishment of the MA-PDU session) a prioritized list of one or more ATSSS rules (e.g., forming the steering policy 110). In various embodiments, each ATSSS rule matches specific traffic (e.g., based on originating application, transport protocol, port number, etc.) and indicates a steering mode for the matching traffic. In the depicted embodiments, the non-default ATSSS rule indicate a preferred access type and/or a forbidden access type. Moreover, a default ATSSS rule indicates a steering mode. While FIG. 7 shows a specific steering mode for the default ATSSS rule, note that any type of steering mode may be used in the default ATSSS rule.

As depicted, the second procedure 700 begins as a new data flow 705 is identified. Here, the ATSSS rules are accessed and characteristics of the data flow 705 are compared to the ATSSS rules to find a matching rule. At step 710, the data flow 705 is compared to the first ATSSS rules (e.g., the highest ranked ATSSS rule). Here, the first ATSSS rule has a traffic filer 'x' and indicates the 3GPP access 405 is a preferred access type. Thus, if characteristics (e.g., originating application, transport protocol, port number, etc.) of the data flow 705 match 'x', then the remote unit steers the data flow 705 to the 3GPP access 405. If the 3GPP access 405 is not available, then the data flow 705 will be steered to the non-3GPP access 410. However, if the characteristics of the data flow 705 do not match 'x', then the next ATSSS rule is considered.

At step 715, the data flow 705 is compared to the second ATSSS rules (e.g., the next-highest ranked ATSSS rule). Here, the first ATSSS rule has a traffic filer 'y' and indicates that the 3GPP access 405 is a preferred access type and that the non-3GPP access 410 is a forbidden access type. Thus, if characteristics (e.g., originating application, transport protocol, port number, etc.) of the data flow 705 match 'y', then the remote unit steers the data flow 705 to the 3GPP access 405. If the 3GPP access 405 is not available, then the data flow 705 cannot be transmitted. However, if the characteristics of the data flow 705 do not match 'y', then the next ATSSS rule is considered.

As depicted, the steering policy 110 may include N number of non-default ATSSS rules. The second procedure 700 includes processing more ATSSS rules 720 (e.g., assuming the data flow 705 does not match the traffic filter of any previously considered ATSSS rules).

At step 725, the data flow 705 is compared to the Nth ATSSS rules (e.g., the lowest ranked non-default ATSSS rule). Here, the Nth ATSSS rule has a traffic filer 'z' and indicates the non-3GPP access 410 as the preferred access type. Thus, if characteristics (e.g., originating application, transport protocol, port number, etc.) of the data flow 705 match 'z', then the remote unit steers the data flow 705 to the non-3GPP access 410. If the non-3GPP access 410 is not available, then the data flow 705 will be steered to the 3GPP access 405. However, if the characteristics of the data flow 705 do not match 'x', then the next ATSSS rule (e.g., the default rule) is considered.

At step 730, the data flow 705 is compared to the default ATSSS rules (e.g., the lowest ranked ATSSS rule). Note here that the first ATSSS rule uses wildcard traffic filer (e.g., '*') so that it will apply to all data flows. Because the default rule is the lowest priority ATSSS rule, the default rule will only be selected if no other ATSSS has a traffic filter matching the characteristics of the data flow 705.

Here, the default ATSSS rule has a 'best-access' steering mode. Thus, if characteristics (e.g., originating application, transport protocol, port number, etc.) of the data flow 705 do not match any other ATSSS rule, then the remote unit steers the data flow 705 to whichever of the 3GPP access 405 and the non-3GPP access 410 offers better performance (e.g., whichever has the lowest RTT). The second procedure 700 ends.

Figure 8:
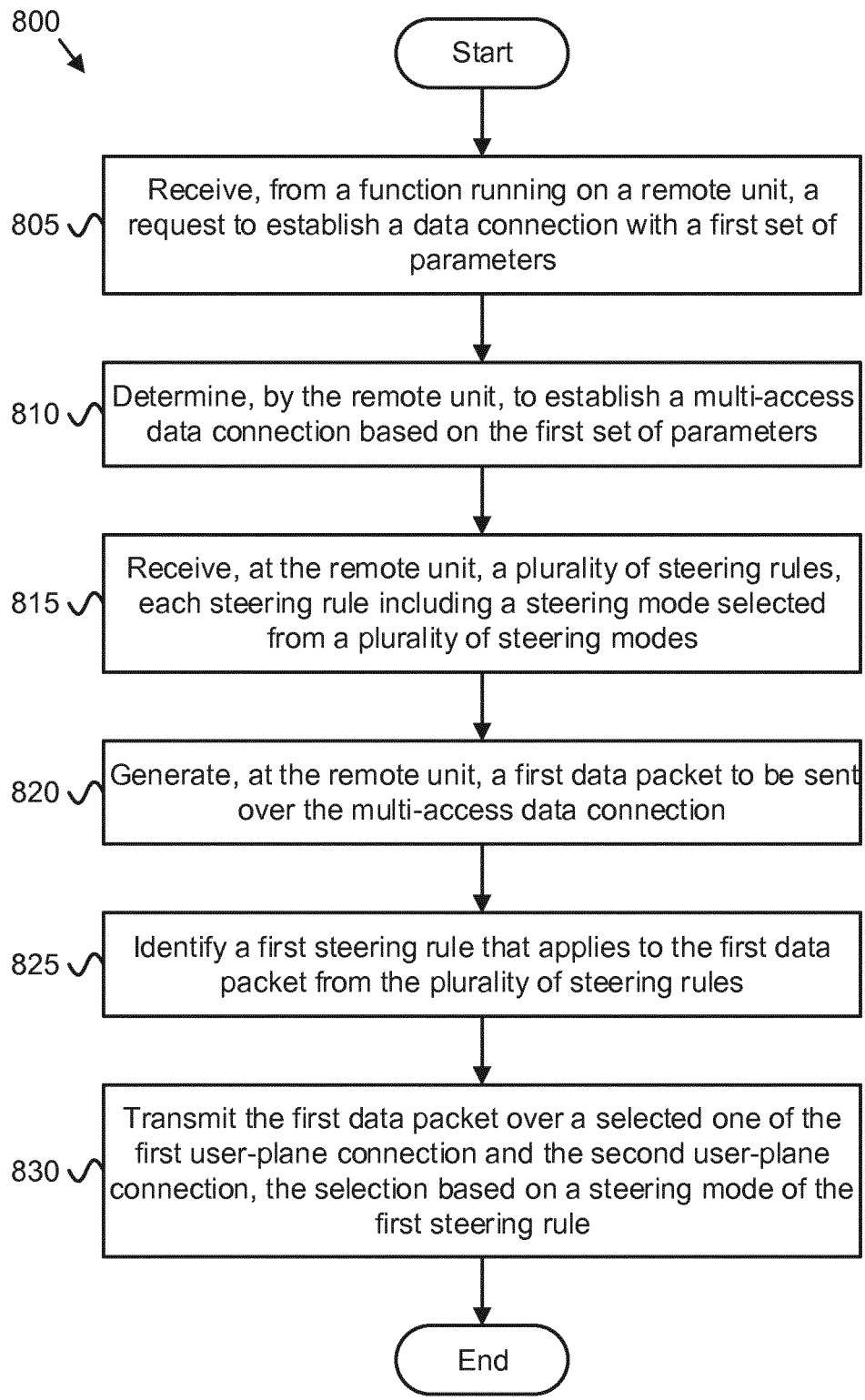
FIG. 8 is a flow chart diagram illustrating one embodiment of a method of a user equipment for steering a data packet to a specific user-plane connection of a multi-access data connection.

FIG. 8 depicts a method 800 for steering a data packet to a specific user-plane connection of a multi-access data connection, according to embodiments of the disclosure. In some embodiments, the method 800 is performed by an apparatus, such as the remote unit 105, the UE 205, and/or the user equipment apparatus 300. In certain embodiments, the method 800 may be performed by a processor executing program code, for example, a microcontroller, a microprocessor, a CPU, a GPU, an auxiliary processing unit, a FPGA, or the like.

The method 800 begins with receiving 805, from a function running on a remote unit, a request to establish a data connection. In certain embodiments, the request to establish a data connection indicates a first set of parameters. Here, the first set of parameters may include one or more of a data network name ("DNN") and a network slice indicator (e.g., a S-NSSAI). In various embodiments, the function running on a remote unit is one of a user application and an OS component.

The method 800 includes determining 810, by the remote unit, to establish a multi-access data connection. Here, the multi-access data connection includes a first user-plane connection over a first access network and a second user-plane connection over a second access network. In various embodiments, determining 810 to establish the multi-access data connection is based on the first set of parameters, for example by comparing the first set of parameters to a connection policy. Here, the connection policy may include a plurality of rules indicating whether a requested data connection with parameters matching the rule is to be a multi-access date connection or a single-access data connection.

The method 800 includes receiving 815, at the remote unit, a plurality of steering rules, each steering rule including a steering mode selected from a plurality of steering modes. In some embodiments, the plurality of steering rules is received 815 during establishment of the multi-access data connection. For example, when establishing a MA-PDU, the plurality of steering rules may be received in a PDU Session Establishment Accept message.

In various embodiments, the steering mode may be one of a priority-based steering mode, an active-standby steering mode, a best-access steering mode, a redundant steering mode, and a load-balancing steering mode. Moreover, the plurality of steering rules may include multiple steering modes, such that a first steering rule includes a different steering rule than a second steering rule.

The method 800 includes generating 820, at the remote unit, a first data packet to be sent over the multi-access data connection. Here, the first data packet may be generated 820 by the function that requested the multi-access data connection. The method 800 includes identifying 825 a first steering rule that applies to the first data packet from the plurality of steering rules. Here, identifying 825 a first steering rule may include comparing characteristics of the first data packet to the traffic filters of the plurality of steering rules.

The method 800 includes transmitting 830 the first data packet over a selected one of the first user-plane connection or the second user-plane connection, the selection based on a steering mode of the first steering rule. Here, the selected user-plane is the user-plane identified using the steering mode of the first steering rule. The method 800 ends.

Figure 9:
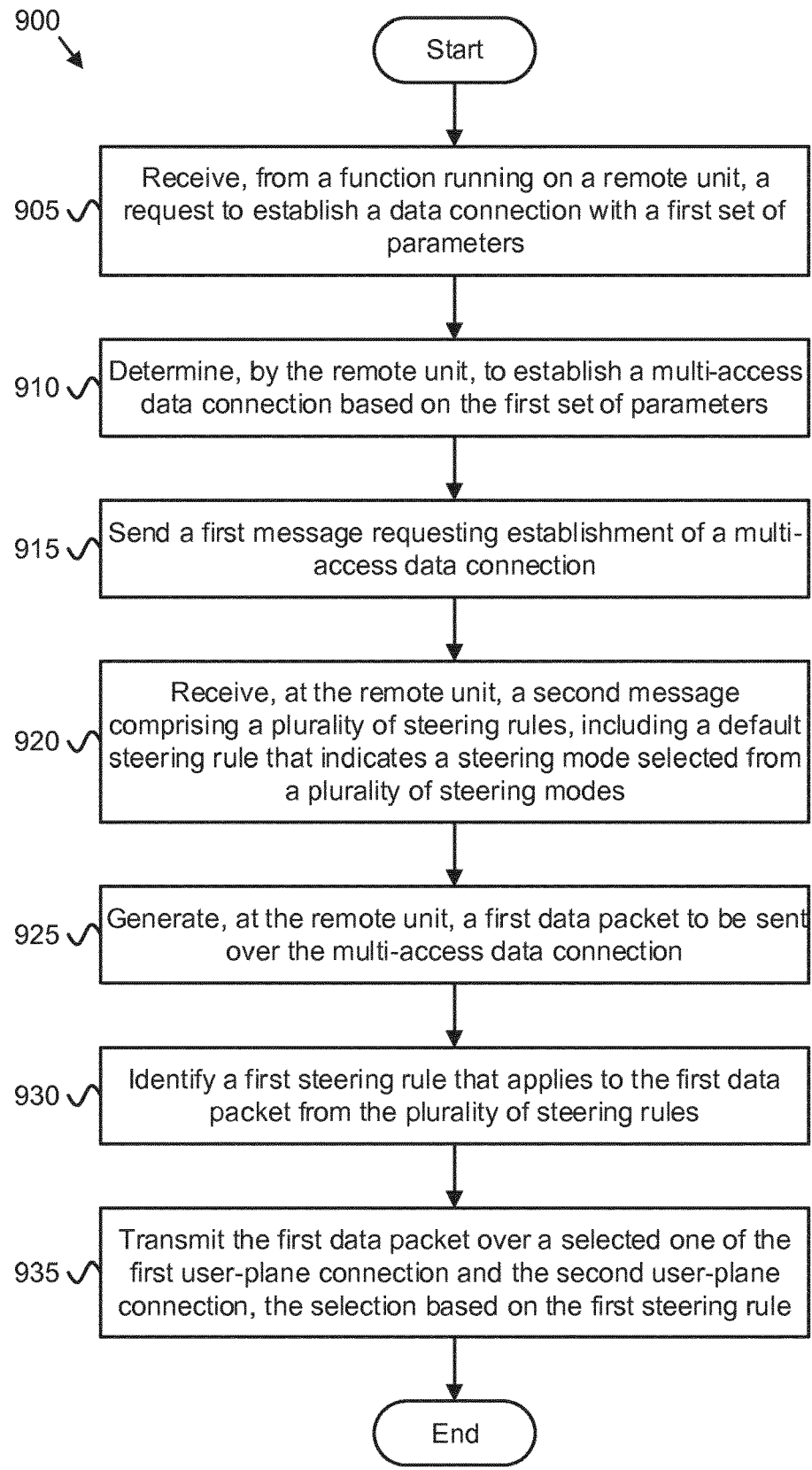

FIG. 9 depicts a method 900 for steering a data packet to a specific user-plane connection of a multi-access data connection, according to embodiments of the disclosure. In some embodiments, the method 900 is performed by an apparatus, such as the remote unit 105, the UE 205, and/or the user equipment apparatus 300. In certain embodiments, the method 900 may be performed by a processor executing program code, for example, a microcontroller, a microprocessor, a CPU, a GPU, an auxiliary processing unit, a FPGA, or the like.

The method 900 begins with receiving 905, from a function running on a remote unit, a request to establish a data connection. In certain embodiments, the request to establish a data connection indicates a first set of parameters. Here, the first set of parameters may include one or more of a data network name ("DNN") and a network slice indicator (e.g., a S-NSSAI). In various embodiments, the function running on a remote unit is one of a user application and an OS component.

The method 900 includes determining 910, by the remote unit, to establish a multi-access data connection. Here, the multi-access data connection includes a first user-plane connection over a first access network and a second user-plane connection over a second access network. In various embodiments, determining 910 to establish the multi-access data connection is based on the first set of parameters, for example by comparing the first set of parameters to a connection policy. Here, the connection policy may include a plurality of rules indicating whether a requested data connection with parameters matching the rule is to be a multi-access date connection or a single-access data connection.

The method 900 includes sending 915 a first message requesting establishment of a multi-access data connection.

In one embodiment, the first message is a PDU Session Establishment Request message.

The method 900 includes receiving 920, at the remote unit, a second message that contains a plurality of steering rules, including a default rule. Here, the default rule indicates a steering mode selected from a plurality of steering modes. In some embodiments, the plurality of steering rules is received 920 during establishment of the multi-access data connection. For example, when establishing a MA-PDU, the plurality of steering rules may be received in a PDU Session Establishment Accept message.

In various embodiments, the steering mode may be one of a priority-based steering mode, an active-standby steering mode, a best-access steering mode, a redundant steering mode, and a load-balancing steering mode. Moreover, the plurality of steering rules may include a prioritized list of non-default rules, wherein each non-default rule indicates that one of the first and the second access is either preferred or forbidden.

The method 900 includes generating 925, at the remote unit, a first data packet to be sent over the multi-access data connection. Here, the first data packet may be generated 925 by the function that requested the multi-access data connection. The method 900 includes identifying 930 a first steering rule that applies to the first data packet from the plurality of steering rules. Here, identifying 930 a first steering rule may include comparing characteristics of the first data packet to the traffic filters of the plurality of steering rules.

The method 900 includes transmitting 935 the first data packet over a selected one of the first user-plane connection or the second user-plane connection, the selection based on a steering mode of the first steering rule. Here, the selected user-plane is the user-plane identified using the steering mode of the first steering rule. The method 900 ends.

Described herein is a first apparatus for steering a data packet to a specific user-plane connection of a multi-access data connection, the first apparatus including a processor, a first transceiver that communicates with a mobile communication network via a first access network, and a second transceiver that communicates with a mobile communication network via a second access network. The processor receives, from a function running on the apparatus, a request to establish a data connection and determines to establish a multi-access data connection. Here, the multi-access data connection includes a first user-plane connection over the first access network and a second user-plane connection over the second access network. The processor receives a plurality of steering rules. Here, each steering rule may include a traffic filter and a steering mode selected from a plurality of steering modes. The processor generates a first data packet to be sent over the multi-access data connection and identifies a first steering rule that applies to the first data packet from the plurality of steering rules. The processor transmits the first data packet over a selected one of the first and second user-plane connections. Here, the selection is based on a steering mode of the first steering rule.

In one or more embodiments of the first apparatus, the plurality of steering rules is received during establishment of the multi-access data connection. In one or more embodiments of the first apparatus, the first user-plane connection and the second user-plane connection are anchored in a same network function within the mobile communication network.

In one or more embodiments of the first apparatus, the request to establish a data connection indicates a first set of parameters. In such embodiments, determining to establish the multi-access data connection includes the processor comparing the first set of parameters to a policy stored at the apparatus, the policy indicating whether to establish a multi-access data connection or a single-access data connection. In various embodiments, the first set of parameters comprises one or more of a DNN and S-NSSAI.

In one or more embodiments of the first apparatus, the apparatus is registered with the mobile communication network via the first access network prior to the request to establish a data connection, wherein the processor further registers with the mobile communication network over the second access network in response to determining to establish the multi-access data connection.

In one or more embodiments of the first apparatus, the first access network is a 3GPP radio access network and the second access network is a wireless local area network.

In one or more embodiments of the first apparatus, the multi-access data connection is a MA-PDU session, wherein establishing the MA-PDU session comprises the processor sending a first message to the mobile communication network over the first access network, the first message requesting establishment of a PDU session over the first access network and the second access network and receiving a second message from the mobile communication network comprising the plurality of steering rules. In one or more embodiments of the first apparatus, wherein the first message is a PDU session establishment request message and the second message is a PDU session establishment accept message.

In one or more embodiments of the first apparatus, the steering mode comprises one of: a policy-based steering mode, a priority-based steering mode, an active-standby steering mode, a best-access steering mode, a redundant steering mode, and a load-balancing steering mode. In one or more embodiments of the first apparatus, the plurality of steering rules includes a first rule having a first steering mode and a second rule having a second steering mode different than the first.

Described herein is a first method for steering a data packet to a specific user-plane connection of a multi-access data connection, the first method includes receiving, from a function running on a remote unit, a request to establish a data connection. The method includes determining, by the remote unit, to establish a multi-access data connection. Here, the multi-access data connection includes a first user-plane connection over a first access network and a second user-plane connection over a second access network. The method includes receiving, at the remote unit, a plurality of steering rules. Here, each steering rule includes a steering mode selected from a plurality of steering modes. The method includes generating, at the remote unit, a first data packet to be sent over the multi-access data connection. The method includes identifying a first steering rule that applies to the first data packet from the plurality of steering rules and transmitting the first data packet over a selected one of the first user-plane connection and the second user-plane connection. Here, the selection is based on the steering mode of the first steering rule.

In one or more embodiments of the first method, the plurality of steering rules is received during establishment of the multi-access data connection. In one or more embodiments of the first method, the first user-plane connection and the second user-plane connection are anchored in a same network function within the mobile communication network.

In one or more embodiments of the first method, the request to establish a data connection indicates a first set of parameters. In such embodiments, determining to establish the multi-access data connection includes comparing the first set of parameters to a policy stored at the remote unit, the policy indicating whether to establish a multi-access data connection or a single-access data connection. In one or more embodiments of the first method, the first set of parameters comprises one or more of a DNN and a S-NSSAI.

In one or more embodiments of the first method, the remote unit is registered with the mobile communication network via the first access network prior to receiving the request to establish a data connection. In such embodiments, the first method includes registering with the mobile communication network over the second access network in response to determining to establish the multi-access data connection.

In one or more embodiments of the first method, the first access network is a 3GPP radio access network and the second access network is a wireless local area network.

In one or more embodiments of the first method, the multi-access data connection is a MA-PDU session, wherein establishing the MA-PDU session comprises sending a first message to the mobile communication network over the first access network, the first message requesting establishment of a PDU session over the first access network and the second access network and receiving a second message from the mobile communication network comprising the plurality of steering rules.

In one or more embodiments of the first method, wherein the first message is a PDU session establishment request message and the second message is a PDU session establishment accept message.

In one or more embodiments of the first method, the steering mode comprises one of: a policy-based steering mode, a priority-based steering mode, an active-standby steering mode, a best-access steering mode, a redundant steering mode, and a load-balancing steering mode. In one or more embodiments of the first method, the plurality of steering rules includes a first rule having a first steering mode and a second rule having a second steering mode different than the first.

Also disclosed herein is a second apparatus that includes a processor, a first transceiver that communicates with a mobile communication network via a first access network, and a second transceiver that communicates with the mobile communication network via a second access network. Here, the processor receives a request to establish a data connection with the mobile communication network and determines to establish the data connection as a multi-access data connection having a first user-plane connection over the first access network and a second user-plane connection over the second access network.

Moreover, the processor sends a first message requesting establishment of a multi-access data connection and receives a second message that includes a plurality of steering rules, including a default steering rule. Here, the default steering rule indicates a steering mode selected from a plurality of steering modes. The processor generates a first data packet to be sent over the multi-access data connection, identifies a first steering rule that applies to the first data packet from the plurality of steering rules, and transmits the first data packet over a selected one of the first user-plane connection and the second user-plane connection. Here, the selection based on the first steering rule.

In one or more embodiments of the second apparatus, the request to establish a data connection indicates a first set of parameters. In such embodiments, determining to establish the multi-access data connection includes the processor comparing the first set of parameters to a policy stored at the apparatus, the policy indicating whether to establish a multi-access data connection or a single-access data connection. In various embodiments, the first set of parameters comprises one or more of a DNN and S-NSSAI.

In one or more embodiments of the second apparatus, the apparatus is registered with the mobile communication network via the first access network prior to the request to establish a data connection, wherein the processor further registers with the mobile communication network over the second access network in response to determining to establish the multi-access data connection. In one or more embodiments of the second apparatus, the first user-plane connection and the second user-plane connection are anchored in a same network function within the mobile communication network.

In one or more embodiments of the second apparatus, the first access network is a 3GPP radio access network and the second access network is a wireless local area network. In one or more embodiments of the second apparatus, the multi-access data connection is a MA-PDU session, wherein the first message is a PDU session establishment request message and the second message is a PDU session establishment accept message.

In one or more embodiments of the second apparatus, the plurality of steering rules includes a prioritized list of non-default rules. Here, each non-default rule may specify one of the first access network and the second access network and indicate whether the specified access is preferred or forbidden. Moreover, the default steering mode may be one of: a priority-based steering mode, an active-standby steering mode, a best-access steering mode, a redundant steering mode, and a load-balancing steering mode.

Also disclosed herein is a second method that includes receiving, from a function running on a remote unit, a request to establish a data connection with the mobile communication network. The second method includes determining, by the remote unit, to establish a multi-access data connection. Here, the multi-access data connection includes a first user-plane connection over the first access network and a second user-plane connection over the second access network. The second method includes sending a first message requesting establishment of the multi-access data connection.

Moreover, the second method includes receiving a second message that includes a plurality of steering rules, including a default steering rule. Here, the default steering rule indicates a steering mode selected from a plurality of steering modes. The second method includes generating a first data packet to be sent over the multi-access data connection, identifying a first steering rule that applies to the first data packet from the plurality of steering rules, and transmitting the first data packet over a selected one of the first user-plane connection and the second user-plane connection. Here, the selection based the first steering rule.

In one or more embodiments of the second method, the request to establish a data connection indicates a first set of parameters. In such embodiments, determining to establish the multi-access data connection includes comparing the first set of parameters to a policy stored at the apparatus. Here, the policy indicates whether to establish a multi-access data connection or a single-access data connection. In various embodiments, the first set of parameters includes one or more of a DNN and S-NSSAI.

In one or more embodiments of the second method, the remote unit is registered with the mobile communication network via the first access network prior to the request to establish a data connection. In such embodiments, the second method may include registering with the mobile communication network over the second access network in response to determining to establish the multi-access data connection.

In one or more embodiments of the second method, the first access network is a 3GPP radio access network and the second access network is a wireless local area network. In one or more embodiments of the second method, the first user-plane connection and the second user-plane connection are anchored in a same network function within the mobile communication network. In one or more embodiments of the second method, the multi-access data connection is a MA-PDU session, wherein the first message is a PDU session establishment request message and the second message is a PDU session establishment accept message.

In one or more embodiments of the second method, the plurality of steering rules includes a prioritized list of non-default rules. Here, each non-default rule may specify one of the first access network and the second access network and indicate whether the specified access is preferred or forbidden. Moreover, the default steering mode may be one of: a priority-based steering mode, an active-standby steering mode, a best-access steering mode, a redundant steering mode, and a load-balancing steering mode.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A user equipment (UE) comprising:
at least one memory; and
at least one processor coupled with the at least one memory and configured to cause the UE to:
receive a request to establish a data connection;
determine to establish the data connection as a multi-access data connection, wherein the multi-access data connection comprises a first user-plane connection over a first access network and a second user-plane connection over a second access network;
perform an establishment procedure to establish the multi-access data connection,
wherein, to perform the establishment procedure, the at least one processor is configured to cause the UE to transmit a Protocol Data Unit ("PDU") session establishment request message to a mobile communication network over one of the first access network and the second access network, the PDU session establishment request message comprising a Multiple-Access Protocol Data Unit ("MA-PDU") indication;
receive, during the establishment procedure, a PDU session establishment accept message comprising a plurality of steering rules, each steering rule comprising a respective traffic filter and a respective steering mode selected from a plurality of steering modes, wherein the respective steering mode comprises one of: a priority-based steering mode, an active-standby steering mode, a smallest-delay steering mode, a redundant steering mode, or a load-balancing steering mode;
generate a first data flow to be sent over the multi-access data connection;

identify, based at least in part on information in a first data packet associated with the first data flow, a first steering rule from the plurality of steering rules that applies to the first data flow;

select a steering mode based on the first steering rule, the steering mode indicating how data traffic matching a traffic filter of the first steering rule is to be routed across one or more of the first access network or the second access network of the multi-access data connection; and transmit the first data flow over a selected one of the first user-plane connection or the second user-plane connection, based on the selected steering mode.

2. The UE of claim 1, wherein the first user-plane connection and the second user-plane connection are anchored in a same network function within a mobile communication network.

3. The UE of claim 1, wherein the request to establish a data connection indicates a first set of parameters, and wherein to determine to establish the data connection as a multi-access data connection, the at least one processor is configured to cause the UE to compare the first set of parameters to a policy stored at the UE, the policy indicating whether to establish a multi-access data connection or a single-access data connection.

4. The UE of claim 3, wherein the first set of parameters comprises a Data Network Name ("DNN"), or single network slice selection assistance information ("S-NSSAI"), or both.

5. The UE of claim 1, wherein the UE is registered with a mobile communication network via the first access network prior to the request to establish the data connection, and wherein the at least one processor is configured to cause the UE to further register with the mobile communication network over the second access network in response to determining to establish the data connection as a multi-access data connection.

6. The UE of claim 1, wherein the first access network is a 3GPP radio access network and the second access network is a wireless local area network.

7. The UE of claim 1, wherein the plurality of steering rules comprises a first rule comprising a first steering mode and a second rule having a second steering mode different than the first.

8. A method performed by a user equipment (UE), the method comprising:

receiving a request to establish a data connection;

determining, by the UE, to establish a multi-access data connection, wherein the multi-access data connection comprises a first user-plane connection over a first access network and a second user-plane connection over a second access network;

performing an establishment procedure to establish the multi-access data connection, wherein performing the establishment procedure comprises transmitting a Protocol Data Unit ("PDU") session establishment request message to a mobile communication network over one of the first access network and the second access network, the PDU session establishment request message comprising a Multiple-Access Protocol Data Unit ("MA-PDU") indication;

receiving, at the UE and during the establishment procedure, a PDU session establishment accept message comprising a plurality of steering rules, each steering rule comprising a respective traffic filter and a respective steering mode selected from a plurality of steering modes, wherein the respective steering mode comprises one of: a priority-based steering mode, an active-standby steering mode, a smallest-delay steering mode, a redundant steering mode, or a load-balancing steering mode;

generating, at the UE, a first data flow to be sent over the multi-access data connection;

identifying, based at least in part on information in a first data packet associated with the first data flow, a first steering rule from the plurality of steering rules that applies to the first data flow;

selecting a steering mode based on the first steering rule, the steering mode indicating how data traffic corresponding to a traffic filter of the first steering rule is to be routed across one or more of the different first access network or the second access network of the multi-access data connection; and transmitting the first data flow over a selected one of the first user-plane connection or the second user-plane connection, based on the selected steering mode.

9. The method of claim 8, wherein the request to establish the data connection indicates a first set of parameters, and wherein determining to establish the data connection as a multi-access data connection comprises comparing the first set of parameters to a policy stored on the UE, the policy indicating whether to establish the multi-access data connection or a single-access data connection.

10. The method of claim 9, wherein the first set of parameters comprises a Data Network Name ("DNN"), or single network slice selection assistance information ("S-NSSAI"), or both.

11. The method of claim 8, wherein the UE is registered with a mobile communication network via the first access network prior to the request to establish the data connection, the method further comprising:

registering with the mobile communication network over the second access network in response to determining to establish the data connection as a multi-access data connection.

12. A user equipment (UE) comprising:

at least one memory; and at least one processor coupled with the at least one memory and configured to cause the UE to:

receive a request to establish a data connection with a mobile communication network;

determine to establish the data connection as a multi-access data connection having a first user-plane connection over a first access network and a second user-plane connection over a second access network;

transmit, during an establishment procedure to establish the multi-access data connection, a Protocol Data Unit ("PDU") session establishment request message over one of the first access network and the second access network, wherein the PDU session establishment request message comprises a Multiple-Access Protocol Data Unit ("MA-PDU") indication;

receive, during the establishment procedure, a PDU session establishment accept message comprising a plurality of steering rules including a default steering rule comprising a respective traffic filter and a respective steering mode selected from a plurality of steering modes, wherein the respective steering mode comprises one of: a priority-based steering mode, an active-standby steering mode, a smallest-delay steering mode, a redundant steering mode, or a load-balancing steering mode;

generate a first data flow to be sent over the multi-access data connection;

identify, based at least in part on information in a first data packet associated with the first data flow, a first steering rule from the plurality of steering rules that applies to the first data flow;

select a steering mode based on the first steering rule, the steering mode indicating how data traffic corresponding to a traffic filter of the first steering rule is to be routed across one or more of the first access network or the second access network of the multi-access data connection; and transmit the first data flow over a selected one of the first user-plane connection or the second user-plane connection, based on the selected steering mode.

13. The UE of claim 12, wherein the request to establish the data connection indicates a first set of parameters, and wherein to determine to establish the data connection as a multi-access data connection, the at least one processor is configured to cause the UE to compare the first set of parameters to a policy stored on the UE, the policy indicating whether to establish the multi-access data connection or a single-access data connection.

14. The UE of claim 12, wherein the plurality of steering rules further comprises a prioritized list of non-default rules, each non-default rule specifying one of the first access network and the second access network and indicating whether the specified access is preferred or forbidden, wherein the default mode is one of a priority-based steering mode, an active-standby steering mode, a best-access steering mode, a redundant steering mode, or a load-balancing steering mode.

15. The UE of claim 13, wherein the first set of parameters comprises a Data Network Name ("DNN"), or single network slice selection assistance information ("S-NSSAI"), or both.

16. The UE of claim 12, wherein the UE is registered with a mobile communication network via the first access network prior to the request to establish the data connection, and wherein the at least one processor is configured to cause the UE to further register with the mobile communication network over the second access network in response to determining to establish the data connection as a multi-access data connection.

17. The UE of claim 12, wherein the first access network is a 3GPP radio access network and the second access network is a wireless local area network.

18. The UE of claim 12, wherein the first user-plane connection and the second user-plane connection are anchored in a same network function within a mobile communication network.

19. A method performed by a user equipment (UE), the method comprising:

receiving a request to establish a data connection with a mobile communication network;

determining, by the UE, to establish a multi-access data connection, wherein the multi-access data connection comprises a first user-plane connection over a first access network and a second user-plane connection over a second access network;

transmitting, during an establishment procedure to establish the multi-access data connection, a Protocol Data Unit ("PDU") session establishment request message over one of the first access network and the second access network, wherein the PDU session establishment request message comprises a Multiple-Access Protocol Data Unit ("MA-PDU") indication;

receiving, during the establishment procedure, a PDU session establishment accept message comprising a plurality of steering rules including a default steering rule comprising a respective traffic filter and a respective steering mode selected from a plurality of steering modes, wherein the respective steering mode comprises one of: a priority-based steering mode, an active-standby steering mode, a smallest-delay steering mode, a redundant steering mode, or a load-balancing steering mode;

generating, at the UE, a first data flow to be sent over the multi-access data connection;

identifying, based at least in part on information in a first data packet associated with the first data flow, a first steering rule from the plurality of steering rules that applies to the first data flow;

selecting a steering mode based on the first steering rule, the steering mode indicating how data traffic corresponding to a traffic filter of the first steering rule is to be routed across one or more of the first access network or the second access network of the multi-access data connection; and transmitting the first data flow over a selected one of the first user-plane connection or the second user-plane connection, based on the selected steering mode.

\* \* \* \* \*